United States Patent
Mylavarapu et al.

(10) Patent No.: US 10,686,819 B2
(45) Date of Patent: Jun. 16, 2020

(54) HIERARCHICAL RISK ASSESSMENT AND REMEDIATION OF THREATS IN MOBILE NETWORKING ENVIRONMENT

(71) Applicant: Proofpoint, Inc., Sunnyvale, CA (US)

(72) Inventors: Ramana M. Mylavarapu, San Jose, CA (US); Ajay Nigam, Milpitas, CA (US); Vipin Balkatta Hegde, San Jose, CA (US)

(73) Assignee: PROOFPOINT, INC., Sunnyvale, CA (US)

( * ) Notice: Subject to any disclaimer, the term of this patent is extended or adjusted under 35 U.S.C. 154(b) by 0 days.

(21) Appl. No.: 14/060,498

(22) Filed: Oct. 22, 2013

(65) Prior Publication Data
US 2014/0237545 A1    Aug. 21, 2014

Related U.S. Application Data

(60) Provisional application No. 61/766,619, filed on Feb. 19, 2013.

(51) Int. Cl.
*H04L 29/06* (2006.01)

(52) U.S. Cl.
CPC ...... *H04L 63/1433* (2013.01); *H04L 63/1441* (2013.01)

(58) Field of Classification Search
CPC .. H04L 63/14; H04L 63/1433; H04L 63/1441
See application file for complete search history.

(56) References Cited

U.S. PATENT DOCUMENTS

| | | |
|---|---|---|
| 7,603,283 B1 | 10/2009 | Spielmann et al. |
| 7,908,660 B2 | 3/2011 | Bahl |
| 7,970,765 B1 | 6/2011 | Olsen et al. |
| 8,201,257 B1 | 6/2012 | Andres et al. |
| 8,468,606 B2 * | 6/2013 | Van De Weyer ..... G06F 21/554 713/187 |
| 8,478,788 B1 * | 7/2013 | Frazier ............. G06Q 10/06 707/802 |
| 8,495,745 B1 * | 7/2013 | Schrecker et al. ........... 726/25 |
| 8,739,290 B1 * | 5/2014 | Jamail ............... G06F 11/0709 726/25 |
| 8,745,746 B1 * | 6/2014 | Jain ................. H04L 63/145 726/25 |

(Continued)

FOREIGN PATENT DOCUMENTS

| | | |
|---|---|---|
| WO | WO-0223343 A1 | 3/2002 |
| WO | WO-12068460 A2 | 5/2012 |

OTHER PUBLICATIONS

Tripathi, Anshu; Singh, Umesh Kumar; "On Prioritization of Vulnerability Categories Based on CVSS Scores", $6^{th}$ International Conference on Computer Sciences and Convergence Information Technology, IEEE, Nov. 29-Dec. 1, 2011, pp. 692-697.*

(Continued)

*Primary Examiner* — Victor Lesniewski
(74) *Attorney, Agent, or Firm* — Sprinkle IP Law Group

(57) ABSTRACT

Mobile device security techniques are described. For a specific computing device, for each of a plurality of distinct security categories, a risk score is determined. The determined risk scores are aggregated to obtain an overall risk score.

27 Claims, 15 Drawing Sheets

(56) References Cited

U.S. PATENT DOCUMENTS

| | | | |
|---|---|---|---|
| 8,763,132 B2* | 6/2014 | Shanley | G06F 21/577 726/25 |
| 8,856,869 B1* | 10/2014 | Brinskelle | H04L 63/08 726/12 |
| 8,918,785 B1* | 12/2014 | Brandwine | G06F 9/45558 718/1 |
| 8,918,883 B1* | 12/2014 | Boyle | G06F 21/577 726/25 |
| 8,949,993 B2* | 2/2015 | Basavapatna | H04W 4/02 726/25 |
| 9,317,692 B2* | 4/2016 | Elder | G06F 21/577 |
| 9,325,728 B1* | 4/2016 | Kennedy | H04L 63/1433 |
| 9,672,355 B2* | 6/2017 | Titonis | G06F 21/56 |
| 2005/0188361 A1 | 8/2005 | Cai et al. | |
| 2005/0216957 A1* | 9/2005 | Banzhof | H04L 63/02 726/25 |
| 2005/0278777 A1* | 12/2005 | Loza | H04L 63/102 726/4 |
| 2006/0101517 A1* | 5/2006 | Banzhof | G06F 21/577 726/25 |
| 2006/0191012 A1* | 8/2006 | Banzhof | G06F 21/577 726/25 |
| 2006/0224742 A1* | 10/2006 | Shahbazi | H04W 12/0027 709/226 |
| 2007/0067848 A1* | 3/2007 | Gustave et al. | 726/25 |
| 2007/0094735 A1* | 4/2007 | Cohen | G06F 21/577 726/25 |
| 2007/0143827 A1* | 6/2007 | Nicodemus | G06F 21/6218 726/2 |
| 2007/0143851 A1* | 6/2007 | Nicodemus | G06F 11/3495 726/25 |
| 2008/0175266 A1* | 7/2008 | Alperovitch et al. | 370/465 |
| 2009/0077666 A1* | 3/2009 | Chen | G06F 21/577 726/25 |
| 2010/0281543 A1* | 11/2010 | Golomb et al. | 726/25 |
| 2011/0119765 A1* | 5/2011 | Hering | G06F 21/577 726/25 |
| 2011/0138471 A1* | 6/2011 | Van De Weyer et al. | 726/25 |
| 2011/0167474 A1 | 7/2011 | Sinha et al. | |
| 2011/0247069 A1 | 10/2011 | Slater | |
| 2012/0079598 A1* | 3/2012 | Brock | G06F 21/577 726/25 |
| 2012/0143650 A1* | 6/2012 | Crowley et al. | 705/7.28 |
| 2012/0185944 A1* | 7/2012 | Abdine | H04L 63/1433 726/25 |
| 2012/0210434 A1* | 8/2012 | Curtis et al. | 726/25 |
| 2012/0304300 A1* | 11/2012 | LaBumbard | G06F 21/577 726/25 |
| 2013/0031634 A1 | 1/2013 | McClure et al. | |
| 2013/0074188 A1* | 3/2013 | Giakouminakis | G06F 21/57 726/25 |
| 2013/0097706 A1* | 4/2013 | Titonis et al. | 726/24 |
| 2013/0167239 A1* | 6/2013 | Amit | G06F 21/577 726/25 |
| 2013/0191919 A1* | 7/2013 | Basavapatna | G06F 21/577 726/25 |
| 2013/0247205 A1* | 9/2013 | Schrecker | G06F 21/577 726/25 |
| 2013/0247207 A1* | 9/2013 | Hugard, IV | G06F 21/577 726/25 |
| 2013/0298192 A1* | 11/2013 | Kumar | G06F 21/52 726/3 |
| 2014/0007241 A1* | 1/2014 | Gula | H04L 63/1433 726/25 |
| 2014/0013434 A1* | 1/2014 | Ranum | H04L 63/145 726/24 |
| 2014/0047545 A1* | 2/2014 | Sidagni | G06F 21/577 726/25 |
| 2014/0047546 A1* | 2/2014 | Sidagni | G06F 21/577 726/25 |
| 2014/0082733 A1* | 3/2014 | Benefield | G06F 21/577 726/25 |
| 2014/0137257 A1* | 5/2014 | Martinez | H04L 63/1433 726/25 |
| 2014/0173739 A1* | 6/2014 | Ahuja et al. | 726/25 |
| 2014/0189873 A1* | 7/2014 | Elder et al. | 726/25 |
| 2014/0337971 A1* | 11/2014 | Casassa Mont | G06F 21/552 726/22 |
| 2015/0304351 A1* | 10/2015 | Oberheide | H04L 63/1433 726/25 |

OTHER PUBLICATIONS

Wang, Ruyi; Gao, Ling; Sun, Qian; Sun, Deheng; "An improved CVSS-based vulnerability scoring mechanism", Third International Conference on Multimedia Information Networking and Security, IEEE, Nov. 4-6, 2011, pp. 352-355.*

Krishna, Anne V.P.; Venkata, Rao J.; Rajasekhara, Rao Kurra; "Enforcing the Security within Mobile Devices using Clouds and its Infrastructure", Sixth International Conference on Software Engineering (CONSEG), IEEE, Sep. 5-7, 2012, 4 pages.*

International Search Report and Written Opinion for counterpart PCT Application No. PCT/US2014/016981, dated Jun. 16, 2014 (15 pages).

European Search Report issued for European Application No. 14753520.7, dated Aug. 25, 2016, 7 pages.

Mobile Security, [retrieved from «www.wikipedia.com» on May 14, 2019, 21 pages.

Examination Report issued for European Application No, 14753520.7, dated Feb. 25, 2019, 6 pages.

Examination Report issued for European Application No. 14753520.7, dated Oct. 30, 2019, 6 pages.

* cited by examiner

HIERARCHICAL RISK ASSESSMENT AND REMEDIATION OF THREATS IN MOBILE NETWORKING ENVIRONMENT

CROSS-REFERENCE TO RELATED APPLICATIONS

This application claims the benefit of U.S. Provisional Application No. 61/766,619, filed on Feb. 19, 2013, which is hereby incorporated by reference in its entirety.

TECHNICAL FIELD

The described technology is directed to the field of computer security.

BACKGROUND

Security is the process of protecting electronic systems from threats of a variety of types.

DETAILED DESCRIPTION

Figure 1:
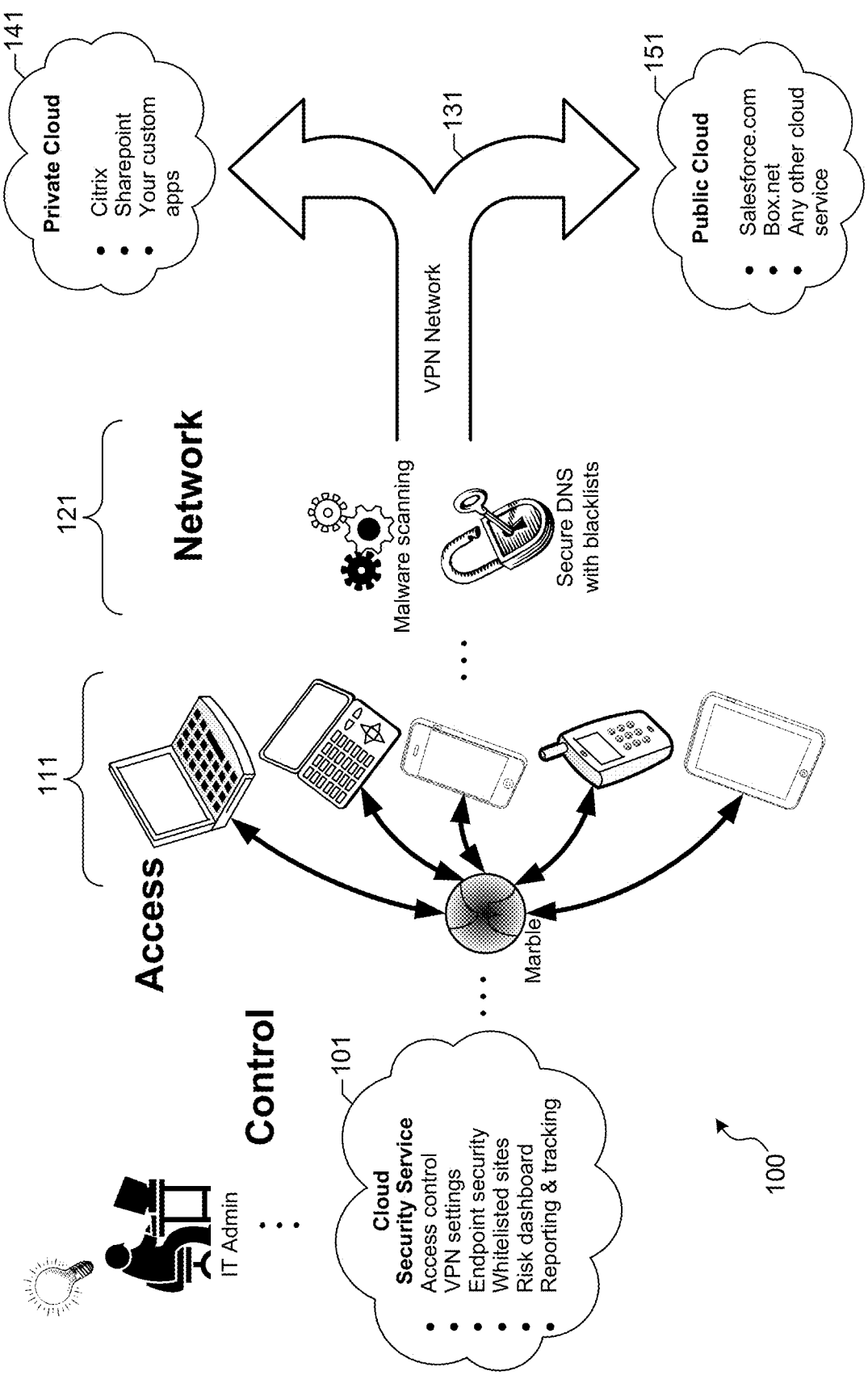
FIG. 1 is a network diagram showing a typical environment in which the facility uses to address security threats.

A software and/or hardware facility for enhancing the security of mobile devices ("the facility") is provided.

Many schemes are used by criminal entities to target employee-owned mobile devices as a way of penetrating corporate firewalls and attack or otherwise exploit the computing resources therein. The inventors have identified the following threats and approaches to addressing them:
1. Malware, trojans and zero-day attacks
2. Key loggers
3. Compromised Wi-Fi hotspots
4. Poisoned DNS
5. Malicious and privacy leaking apps
6. Jail broken and rooted devices
7. Unpatched OS Versions
8. Spear phishing
9. Advanced persistent threats 1. Malware, Trojans and Zero-Day Attacks While malware is generally seen as impacting PCs running the Windows operating system, increasing volumes of malware target users of Apple's Mac OS, as well as mobile devices running a variety of operating systems. Commercial antivirus software tends to be about 80 percent effective in protecting against malware, crimeware, and zero-day attacks. Sometimes, depending on the commercial antivirus products used, that detection rate can fall to less than 25 percent. While these solutions are an important defense, they generally fail to completely protect enterprise users from virus infection because malware authors are creating new samples at unprecedented rates.

In 2012 alone there were approximately 34 million new pieces of unique malware distributed, bringing the total volume to a staggering 90 million pieces, according to The AV-Test Institute, one of the leading providers of IT security and anti-virus research. These Figures include polymorphic malware, which generates a unique variation for each user.

The most significant new targets for malware are mobile devices, as criminals increasingly attack employee-owned smartphones and tablets to penetrate the corporate firewall and exploit enterprise networks. According to McAfee's most recent threats report, mobile malware saw a 700% increase over 2011, with more than 13,000 unique pieces of mobile malware identified in 2012 alone.

Anti-malware software scanning solutions for mobile devices are not nearly as sophisticated as those for PCs. As a result, the potential risks of an employee using an infected Android tablet or a smart phone to access corporate infrastructure, such email, cloud services, or the internal network are significant.

Drive-by malware attacks on mobile devices have become prevalent on Android devices. With the drive-by strategy, criminals redirect visitors of a website to one they control, whereupon the malware automatically installs itself on the user's Android device, basically rooting it. Once the malware takes over the device it may track data from applications, monitor network traffic, GPS information and even the user's keystrokes, ultimately sending all this information to third party servers.

Solving Malware, Trojans and Zero-Day Attacks

Continuing the arms race against the exploding malware problem has proved to be a zero-sum game. The best approach for IT is to completely isolate users from unknown malware by creating a virtualized security environment, particularly on Windows and Mac computers. This approach uses a virtual machine that runs a hardened Linux environment that is separate from the computer's Windows or Mac operating systems. From this highly secure environment, which can include watchdog processes, a user can run VPN services and browsing. This approach effectively isolates the user against new malware and zero-day attacks on the most popular operating systems.

Similarly, Android and iOS devices can also take advantage of isolating and sandboxing technologies to create virtualized browsing environments that restrict access to websites set-up to infect mobile devices with malicious content.

2. Key Loggers

Key loggers, or keystroke logging, continues to be one of the primary ways cyber criminals compromise virtual private networks, corporate networks, email accounts, and online banking sites. Basically, a hacker inserts a driver beneath the operating system that tracks everything the user types, sending the information to third party servers, where sign-on credentials can be exploited.

While key loggers have become more sophisticated, they've also gone cross-platform. Key loggers were originally only available on the Windows platform, but they have now become available on the Mac platform, primarily through malicious apps that users are tricked into downloading.

Increasingly, key loggers have targeted both Android and iOS devices. One strategy is to jailbreak or root the device and install a key logger directly on the device. Another way is for hackers is to publish a tampered-with virtualized keyboard for iOS or Android—such as the Emoji Keyboard, which lets users insert small icons within text or email messages—so that every keystroke on your iPhone, iPad or Android device is recorded and sent to a third party server.

Solving Key Loggers

An approach to solving key logging on the Windows and Mac platforms is installing a driver beneath the operating system that encrypts all keystrokes to the application within a secured virtualized operating system. This method will potentially stop key logging before it can take over the device. If key strokes are sent to third party servers, hackers will only see an encrypted stream of communications and will be unable to steal users' credentials for VPN or online cloud services.

For Android and iOS devices, scans can be conducted that discover known malicious apps and suspicious behavior, such as sending data from the device, and access to the network denied until the apps are removed.

3. Compromised Wi-Fi Hotspots

With Wi-Fi hotspots available in many locations, information workers connect to the Internet to access corporate services from places such as coffee shops, airports, airplanes, and hotels. In many cases, public Wi-Fi hotspots lack one or more of firewall protection, web filtering, and web intrusion systems. Corporate data is vulnerable whenever an employee logs into a Wi-Fi hot spot.

Wi-Fi networks are frequently configured so users can see everyone who's on the network. For instance, if an employee uses a non-encrypted connection to access Facebook, email or SharePoint, their session can be easily hijacked by a hacker on the network. FireSheep, a commercial, downloadable app, allows users to see any non-encrypted connection on a network and hijack sessions. Once a hacker gets into an employee's Facebook account, they can send emails to friends, malicious links, and malware. In addition, the hacker also knows a great deal about the employee: their name, what they look like, possibly where they're traveling. Essentially, any kind of traffic can be intercepted over most hotspots.

More important, users typically can't assess what entity is providing the Domain Name System (DNS) from a hotspot. DNS services allow users to type a domain name in their browser and directs them to the IP address of a destination website. Hackers regularly scan Wi-Fi networks, log into them, and redirect traffic to a malicious DNS server, where they can point an employee to a bogus site that looks like your company's. When the unsuspecting employee logs into the pirate site, they surrender their password and credentials, and the hacker gains access to your corporate network.

In addition, criminals can use the man-in-the-middle approach to intercept all Wi-Fi traffic and spoof any website. An employee user may think they're logging into their Gmail account, or his or her employer's corporate site, but they've been tricked and hackers have captured login information that can be exploited.

Solving Compromised Wi-Fi Hotspots

Employees must have a way to encrypt all communications over Wi-Fi hotspots from end-to-end. Enterprise VPN must be pre-configured to ensure that it's running before connecting to any enterprise service. If a company does not have VPN and remote employees are connecting to salesforce.com or some other cloud service, the connection should run through a private, third party VPN to prevent session hijacking and man-in-the-middle schemes. With this approach, hackers running compromised DNS or ISPs cannot snoop on the traffic and target users' destinations. Similarly, applications on Android devices, iPhones and iPads can be protected in the same way to assure that they go to the servers they're designed to visit.

4. Poisoned DNS

While DNS is typically not viewed as a danger to enterprise security, this can be an expensive mistake, particularly with respect to mobile wokers. Most devices, regardless of platform, are preconfigured to use the DNS served up by Wi-Fi hotspots, ISPs, telecoms, or even the hotel where your employee is using the house internet service. Such preconfiguration is predicated on misplaced trust of any accessible DNS server, yet it's impossible to know enough about most DNS servers to establish that they are trustworthy.

In late 2012, two attacks occurred in Romania and Pakistan in which DNS servers were poisoned and entire countries routed traffic to fake, malicious websites. For example, a user could type www.mybank.com, and the DNS would point them to a different server that takes them to a website that looks like their bank, when it is actually a transparent proxy designed to steal passwords. This scheme has also been used to target a VPN endpoint to trick users into disclosing VPN passwords.

Solving Poisoned DNS

What's needed to protect against poisoned DNS is a separate, private, and secure DNS service that can be accessed by employees' mobile devices—whether running Windows, Mac OS, Android, or iOS. Users must be able to access this secure DNS service through a third party VPN service that ensures they are directed to valid Web sites. This practice will override connecting to the DNS served by the local Wi-Fi hot spot, ISPs, hotels, or airports.

In addition, the secure DNS service can be further strengthened by integrating it with a real-time blacklist service that will prevent employees from visiting web sites that are known to either distribute malware or phishing webpage.

5. Malicious and Privacy Leaking Apps

Not every app installed on each user's smartphones or tablets is secure. If a user is only using the Apple App Store or Google Play to obtain applications for an iOS or Android device, and the user is not using a jail-broken iPhone or rooted Android device, there should be a relative sense of security.

However, even in this relatively benign scenario, there are still dangerous applications that can leak sensitive corporate information from those devices. For instance, an employee may install a game or a productivity app that asks for access to their address book, which may contain the names and critical information of every other employee, since employee address books are connected to Microsoft's Active Directory. The app will then send the entire contents of the address book to a server on the Internet, from which it could be stolen by hackers. That means there might very well be a poorly-protected database in the cloud that contains all the names, titles, phone numbers, and email addresses of each of your employees. With access to this information, hackers have everything they need for spear phishing and advanced persistent threats.

In yet another scheme, malware writers download real applications from the Google Play marketplace—such as Angry Birds, Instagram, or the Opera web browser for Android—and insert malicious code designed to steal information. Once the malicious app has been reconfigured for their purposes, hackers post them on third party marketplaces where they are commonly downloaded. With more than 120 third party Android marketplaces available, for example, it's unreasonable to expect employees to install applications only downloaded from Google Play.

Malware writers have also begun creating malicious online banking apps. The original apps are downloaded from legitimate sources, then modified to be one-time password tokens for online banking. Emails are then sent to the bank's customers to invite them to download the malicious apps. When used by unsuspecting bank customers, the fake tokens allow criminals to take over the user's bank account.

Solving Malicious and Privacy Leaking Apps

A cloud service can scan all the apps on a mobile device and integrates with a real-time service that rates both malicious apps and apps that leak privacy information. IT can then establish policies that forbid access to the network by any device with an installed malicious or privacy leaking app, and guides the employee through the process of removing it from their device.

6. Jail Broken and Rooted Devices

Jail-broken iPhones and rooted Android devices are by definition completely unsecured and should always be prevented from accessing corporate networks. Sometimes an employee may not even know that their iOS or Android device has been jail broken. Perhaps the employee's teenage child has decided to jail break their parent's iPad to download an app for free, and the employee has no idea the next time they log into corporate services that they are using a compromised device.

Solving Jail Broken and Rooted Devices

Algorithms that detect jail broken and rooted devices can be used in conjunction with policies that prohibit network access to these severely compromised devices.

7. Unpatched OS Versions

Allowing employees access to the corporate network with unpatched versions of operating systems is clearly one of the greatest security threats. Older versions of operating systems are very frequently vulnerable to zero-day threats, known threat factors, and malware designed to attack specific versions of the operating system.

Solving Un-Patched OS Versions

The unpatched OS problem can be addressed by recording the version of the operating system for Android and iOs devices and posting it when the employee logs into the network. Administrators can then set policies that specify whether to allow access to the network to the employee using a device with an unpatched OS.

A good approach to protect Windows and Mac OS computers with unpatched operating systems is to use a virtualized security environment. By using a virtual machine running a hardened Linux environment, the unpatched OS is completely isolated from the network, allowing the employee to run VPN services and browse securely. This approach would effectively allow an employee logging into the network from their home PC running a very old Windows 98 OS to access a virtual and highly-secure operating system that protects the corporate network.

8. Spear Phishing

Spear phishing—the practice of targeting specific users' information within a corporation, rather than every subscriber to eBay or PayPal,—is a significant threat to businesses and government agencies. Spam filters have been an effective defense against emails used by hackers, yet more than 300,000 new phising sites a month were discovered in 2012.

There are two kinds of spear phishing attacks that have proven most effective: a general email attack targeting employees of a specific company and SMS phishing.

For the typical email attack, the hacker obtains an employee's email address and sends a message with a malicious link or file attachment. The employee may read the message while in a meeting and unwittingly follow the link in the email, which takes them to a phishing site that installs malware. The employee may know better, but they're multi-tasking, trying to read a small screen, and probably not using their best judgment.

SMS phishing, or smishing, is the practice of sending people phishing text messages that try to get users to log in to their banking or PayPal accounts, or more insidiously, their corporate network.

Solving Spear Phishing

Similar to the solution discussed in the "Poisoned DNS" section above, spear phishing is addressed by a separate, private and secure DNS service that can be consistently accessed by employees' mobile devices. Employees access this very secure DNS service through a third party VPN service that ensures they are only directed to valid websites and prevents visiting any spear phishing sites. Integrating the DNS server with a real-time whitelisting service that prevents employees from visiting sites that aren't approved by IT further strengthens protection.

9. Advanced Persistent Threats

Advanced persistent threats, or APT, is a name for focused attacks by criminal organizations that devote significant resources and time to figuring out a way to penetrate any corporation's network. The sophisticated and well-organized criminal organizations that perform these attacks may seek access to banking resources such as: ATM switches to change limits because they have a cache of stolen credit card accounts; ACH to move money; and account systems to move money between accounts. They may even figure out how to get into retail point-of-sale systems and use man-in-the-middle techniques to intercept those transactions, or remotely push firmware updates containing Trojan horses into those point-of-sale systems.

Extremely sophisticated and highly secured corporate networks sometimes fall to advanced persistent threats. For instance, RSA Security was breached in 2011 and its entire database of RSA tokens was stolen during an attack that lasted for 6 months. The way the cyber criminals targeted RSA was very simple: phony emails supposedly coming from RSA's human resources department were sent to a half dozen employees advertising open job requisitions. When the employees downloaded the infected PDF file attached to the message, a Trojan horse was installed on their computers, admitting the criminals to the RSA network.

Once malicious software is on an end user's device and connected to a corporate network, either at the office or through VPN, criminals are free to break into Active Directories servers, escalate privileges on various servers, and survey everything in the network.

Solving Advanced Persistent Threats

Needless to say, protecting an organization's employees is the first line of defense against advanced persistent threats. The end user is most vulnerable to attacks on their own devices, on all platforms, either at home or when they are on the road. The best defense against these attacks is a layered solution that combines virtualization, tracking, network security and DNS security that in effect creates a secure, isolated environment that's always clean.

The facility protects against the ever-changing threats unleashed into enterprises by mobile devices, and uses adaptive protection to reduce risks to corporate data, networks and applications. The facility secures mobile workers' access to corporate and public networks and cloud services on Android and iOS mobile devices, as well as Macs and Windows PCs, offering comprehensive protection.

FIG. 1 is a network diagram showing a typical environment in which the facility uses to address security threats. The network environment 100 consists of three components: a Control component 101, an Access component 111, and a Network component 121.

In the Access component, employees download an Access application onto whatever device they intend to use to access the company network: a PC or Mac or other desktop or laptop computer, and/or a tablet or smartphone, such as an Android, Windows Phone, or iOS device. For Android devices, the app is available from Google Play; for iOS devices the app is offered at the Apple App Store; etc. For the Windows and the Mac OS platforms, the end user may download the application onto their computer from an email link that's sent by an IT administrator. Once the user registers the application, that endpoint becomes intrinsically bound to the employer's management service, offering administrators of the employer control over risk and the device.

The Network component is a purpose-built private network that allows an employer's IT team to either move traffic through their own VPN service, or a third-party VPN such as UPN 121. If a company has its VPN infrastructure, it's possible to embed its VPN client within the client. If your enterprise is without a VPN infrastructure, the VPN can be used by itself with complete security and confidence. Users can then securely access private cloud data that sits behind a firewall, such as Citrix or SharePoint, as well as public cloud services like salesforce.com and box.net.

By logging into the Control component's administrative control center, a company's IT team can set policies, run risk reporting, and access a rich dashboard to track which employees have devices, the devices used, applications, and data downloaded. From that management console policies for privacy and passwords can be set, and devices provisioned and de-provisioned.

The Network component offers mobile workers:

Isolated web browsing: On PCs and Macs, virtualization technology provides a read-only browser invulnerable to malware. For iOS and Android devices, a secure browser provides a protected environment where personal data is never stored on the device so it can't be stolen or leaked.

Secured encrypted connections: Protects online sessions from crimeware and network attacks from a virtualized workspace to inside the firewall.

Verified web destinations: Secure DNS look-up prevents browser redirects from poisoned DNS and other threats.

Site access control: Blacklists and whitelists prevent visiting malicious sites to protect against phishing and malware attacks.

Data loss prevention: Policy management by user, device and content to control copying, pasting, and printing over the network.

Compliance and risk management: Built-in password protection and management, content loss prevention, and centralized control over remote devices helps reduce risk and achieve regulatory compliance.

Password protection and management: Protects against phishing scams and redirect attacks using real-time website blacklists and whitelists.

Unifed user experience: Works similarly across all devices, with the same interface for desktop and mobile devices, regardless of platform.

Figure 2:
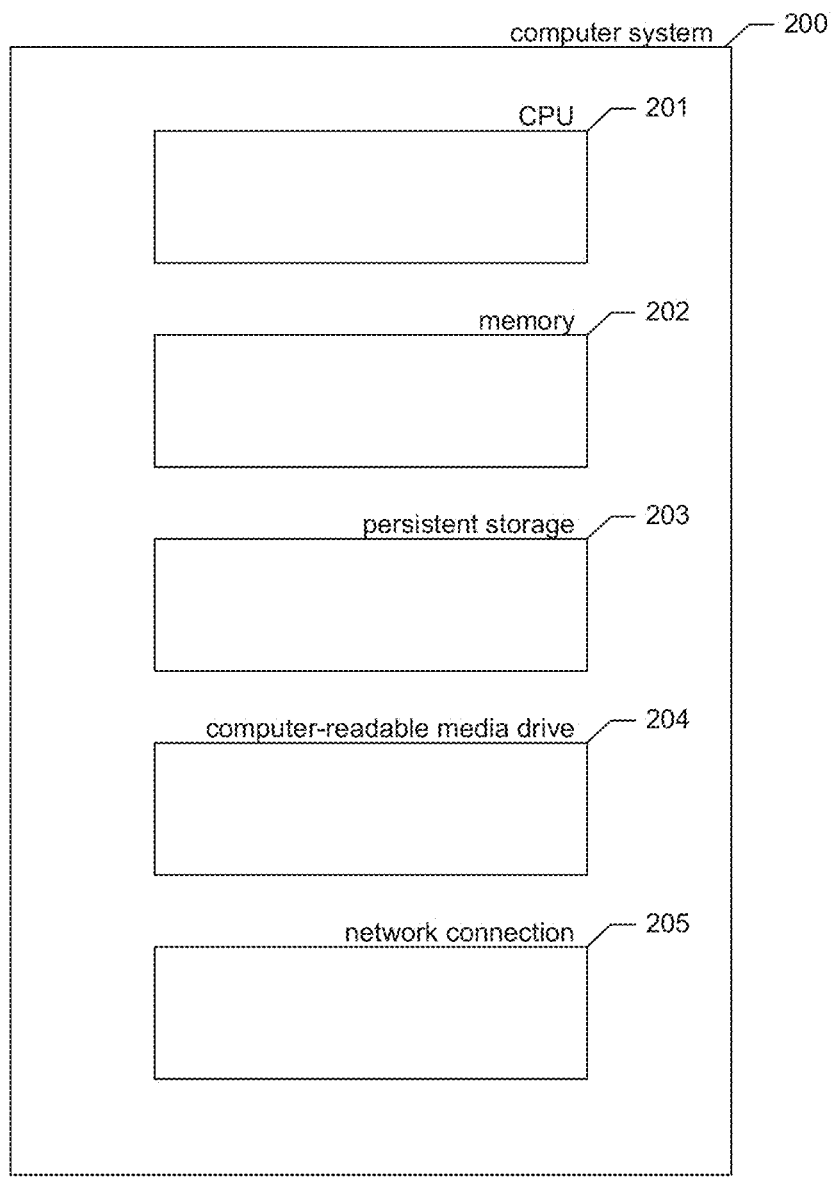
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

A glossary expanding relevant acronyms follows in Table 1.

TABLE 1

Glossary

| acronym | Expansion |
| --- | --- |
| CVSS | Common Vulnerability Scoring System |
| MA | Marble Application |
| MD | Mobile Device |

TABLE 1-continued

Glossary

| acronym | Expansion |
|---|---|
| MD | Marble Cloud Dashboard |
| MN | Marble Secure Network |
| MS | Marble Security Service |
| MDRM | Mobile Device Risk Management |
| NIST | National Institute of Science and Technology of United States |
| SSO | Single Sign-on |
| CVE | Common Vulnerability Enumeration |
| MVE | Marble Vulnerability Enumeration |

Figure 3:
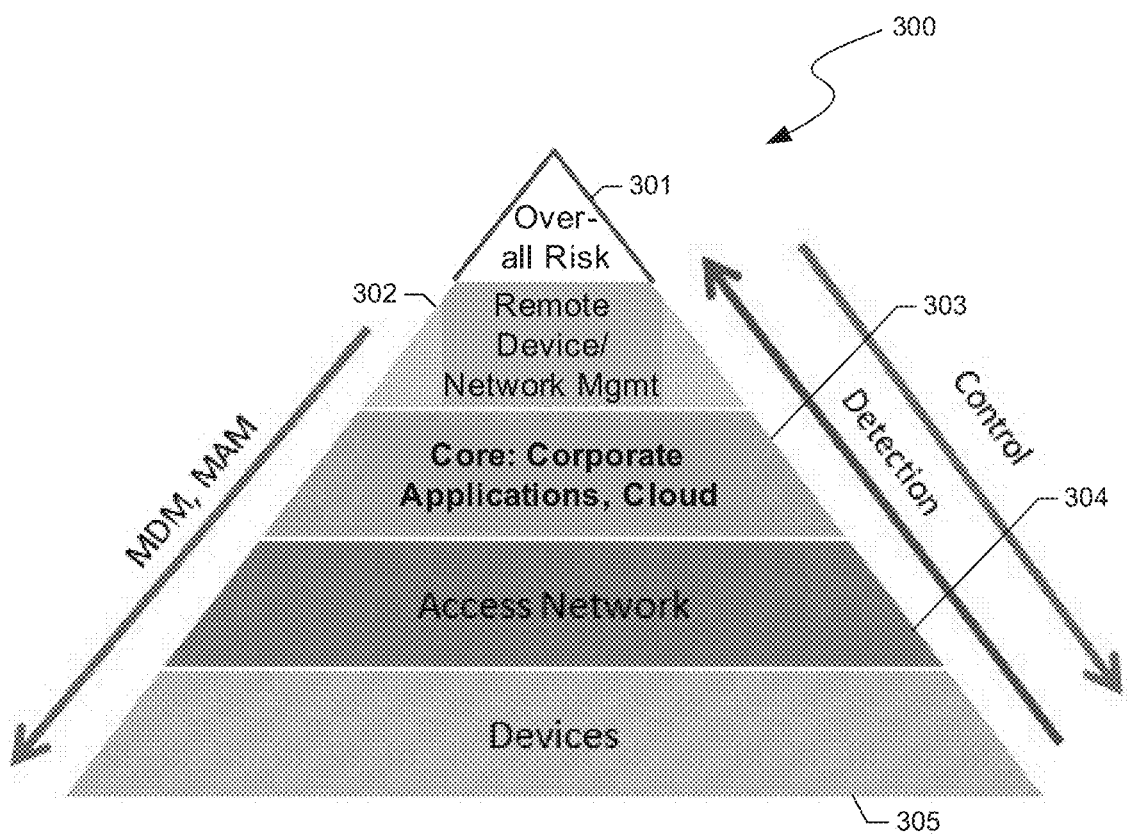
FIG. 3 is a conceptual diagram showing a Security Hierarchy used by the facility in some embodiments.

There are a number challenges often associated with mobile threats:
- Mobile threats are new to IT landscape and/or enhanced by mobile devices
- Mobile devices are typically not connected to corporate network, so traditional security controls such as Firewall, IDS, content filtering, etc. will do little
- Little control on what applications being installed and how they are being used by users
- Little/no knowledge on mobile device threats on enterprise resources, applications & services FIG. 3 is a conceptual diagram showing a Security Hierarchy used by the facility in some embodiments. In some embodiments, the facility monitors and detects vulnerabilities posed by a mobile networking environment comprising access devices such as smartphones or tablets (hereafter called a Mobile Device), the network, identity of the user, and known vulnerabilities in the following hierarchy: mobile device at rest or in motion 305; mobile device connecting to an access network 304; mobile device accessing the resources of the cloud network 303; mobile device accessing identity services, applications, services and hosts 302. In some embodiments, the facility profiles the assessment of mobile risk at each stage of the above hierarchy, risk remediation risk profiling, and arriving at overall risk score through correlation techniques as a basis for mitigating mobile security issues.

Figure 4:
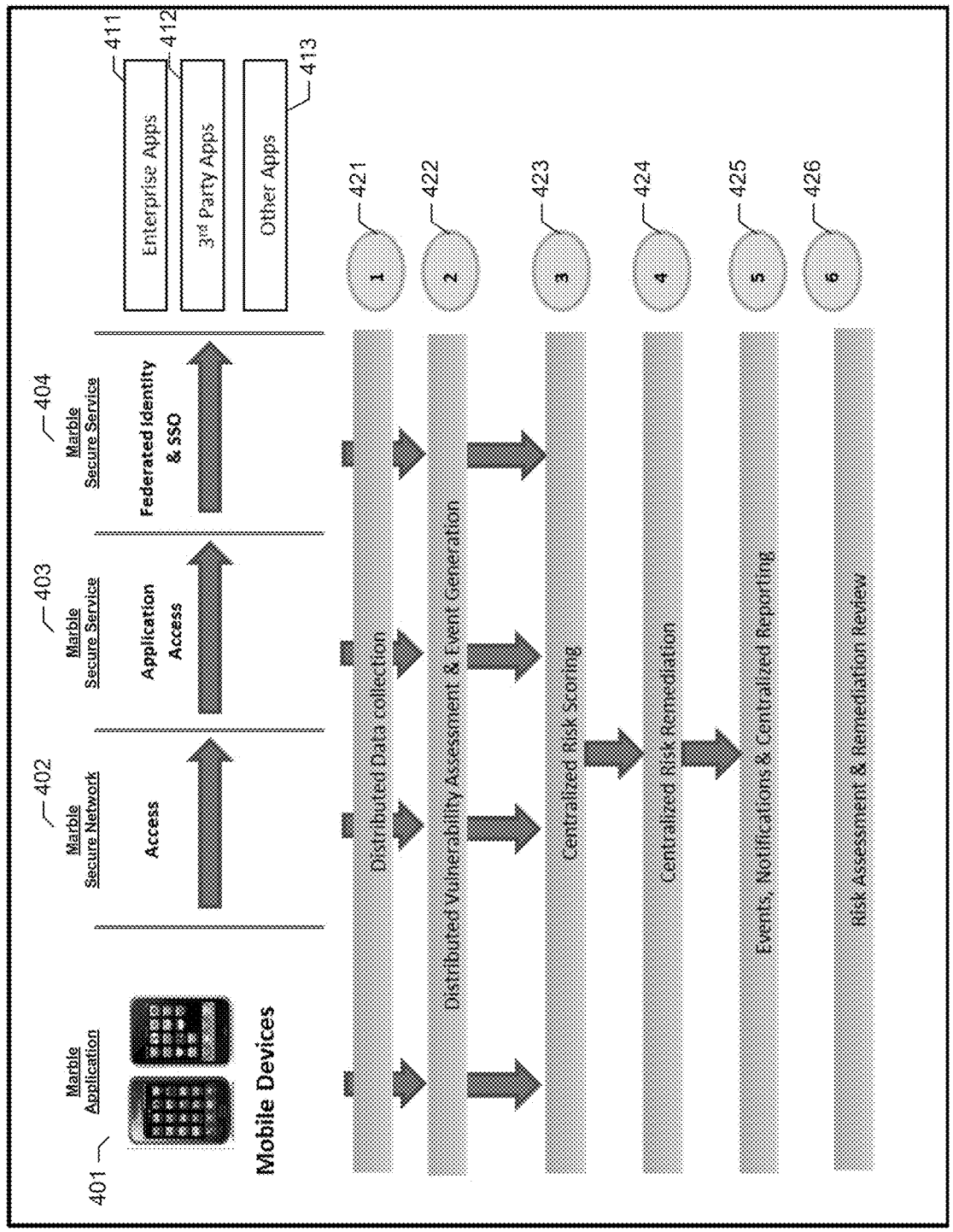
FIG. 4 is a data and processing flow diagram depicting a Hierarchical Risk Assessment Process performed by the facility in some embodiments.

In various embodiments, the facility:
- Manages vulnerability groups, metrics, policies, vulnerability enumerations, risk scoring methods, etc.
- Monitors vulnerabilities end to end (device to application access)
- Converts the vulnerability data into actionable information
- Normalizes vulnerability scores across all sources through common vulnerability management policy
- Uniformly derives the scores as per identifiable threat characteristics
- Performs vulnerability scoring to represent the actual risk and remediation priority
- Prioritizes the vulnerabilities based on the threat level and remediate
- Performs risk security control assessment FIG. 4 is a data and processing flow diagram depicting a Hierarchical Risk Assessment Process performed by the facility in some embodiments. This process permits mobile devices 401 to access, via a secure network 402, a secure service providing application access 403 and federated identity and SSO, as a way of securely using enterprise applications 411, third party applications 412, and other applications 413. The process proceeds as follows:

1: Distributed Data Collection

In step 421, the facility performs risk assessment on data from each source of information. This data can be both static and/or run-time depending on the nature of the vulnerability. The facility collects this data from the source using probes (examples: MDM APIs, Native APIs, etc.) and/or functional modules (example: Marble App, VPN client or authentication module, SSO module, etc.) that provide vulnerability events (examples: user behavior in logging into Marble Service, anomalies in VPN connection setup, etc.).

2: Distributed Vulnerability Assessment

In step 422, the facility further analyzes this data for possible vulnerabilities (example: Device OS Version, Device configuration against a reference policy data, Device Malware assessment). The facility develops the vulnerability assessment for each source to detect the possible vulnerabilities. As mentioned above, some of the functional modules themselves generate the vulnerability events. In some embodiments, these vulnerability assessment modules provide the vulnerability events with threat priority as none, low, medium, and high.

3: Centralized Risk Scoring (in Marble Service)

In step 423, the risk engine processes these vulnerabilities in order of their priority. It looks up a matching vulnerability policy to provide a risk score, risk vector and normalized threat priority for each of them. Of those vulnerabilities that do not have a matching policy, the risk engine queues them to Marble Service Admin to (1) review and (2) add corresponding vulnerability policies.

4: Centralized Risk Remediation (in Marble Service)

In step 424, the risk engine further processes the vulnerability by looking up a best matching risk remediation policy and performs the action/control as per the remediation policy. The risk engine queues vulnerabilities that do not have a remediation policy to Marble Service Admin to (1) review and (2) add vulnerability policies.

5: Events, Notifications and Centralized Reporting

In step 425, the risk engine generates events and notifications of these normalized vulnerability events in the order of priority and reported on Marble Dashboard.

6: Risk Assessment & Remediation Review

In step 426, the facility enables the Marble Service Admin and IT Admin to use the Marble Dashboard to drill down a vulnerability event and remediation event and, outside the event context, will be able to review end to end flow (from data collection to risk scoring & normalization), the risk remediation actions taken, and the outcome, respectively. The facility enables the Admins to make changes to its threat priority, vulnerability policies and remediation if needed, and/or perform manual actions from the Marble Dashboard.

In some embodiments, the facility uses the vulnerability characteristic groups shown below in Table 2 for its CVSS vulnerability scoring framework.

TABLE 2

Vulnerability Characteristic Groups

| Vulnerability Characteristic Group | Definition | Metrics |
|---|---|---|
| Base | Threat characteristic that is constant over time and user environments. | How exploited and degree of loss (impact) |
| Temporal | Threat characteristic that changes over time but not among user environments. | Exploitability, Remediation level and Report Confidence |
| Environmental | Threat characteristic that is unique to a user's environment. | Collateral damage potential, Target distribution and Security Requirements |

In some embodiments, the facility uses the CVSS values shown below in table 3 to quantify the security impact of events with respect to confidentiality, integrity, and availability.

TABLE 3

Simple Metric Values Used by the Facility in
Some Embodiments, Based on Degree of Loss

| Degree of Loss | CVSS Value |
|---|---|
| Confidentiality Impact(C) | |
| None(N): No impact | 0.0 |
| Partial(P): Considerable information disclosure | 0.275 |
| Complete(C): Total information disclosure | 0.660 |
| Integrity Impact(I) | |
| None(N): No impact | 0.0 |
| Partial(P): Modification of some information is possible | 0.275 |
| Complete(C): Total compromise of information | 0.660 |
| Availability(A) | |
| None(N): No impact | 0.0 |
| Partial(P): Reduced performance or interruptions in affected resource availability | 0.275 |
| Complete(C): Total shutdown of affected resource | 0.660 |

In some embodiments, the facility uses the CVSS values shown in table 4 below to quantify the security impact of an event with respect to access vector, access complexity, and authentication.

TABLE 4

Simple Metric Values Used by the Facility
in Some Embodiments, Based on How Exploited

| How exploited | CVSS Value |
|---|---|
| Access Vector(AV) | |
| Local(L): Vulnerability exploited by local access | 0.395 |
| Adjacent Network(A): Vulnerability exploitable with adjacent network | 0.646 |
| Network(N): Remotely exploitable | 1.0 |
| Access Complexity(AC) | |
| High(H): Specialized Access Conditions | 0.35 |
| Medium(M): Somewhat specialized Access Conditions | 0.61 |
| Low(L): Not specialized or extenuating circumstances | 0.71 |
| Authentication(AU) | |
| Multiple(M): Requires multiple authentications | 0.45 |
| Single(S): Requires single authentication | 0.56 |
| None(N): Does not require authentication | 0.704 |

In some embodiments, the facility uses the CVSS values shown in table 4 below to quantify the security impact of an event with respect to exploitability, remedial level, and report confidence.

TABLE 5

Simple Metric Values Used by the Facility in
Some Embodiments, Based on Impact of Threats

| Impact of Threats posed by vulnerability that may change over time | CVSS Value |
|---|---|
| Exploitability(E) - Techniques or code available | |
| Unproven(U) | 0.85 |
| Proof of Concept(PoC) | 0.90 |
| Functional(F): Techniques exist | 0.95 |
| High(H): Widely available | 1.0 |
| Not Defined(ND): No influence on the score | 1.0 |
| Remedial Level(RL) - Remediation level of vulnerability | |
| Official Fix(OF): Solution available from the vendor as a fix or patch | 0.87 |
| Temporary Fix(TF) | 0.90 |
| Work Around(WA) | 0.95 |
| Unavailable(U): No solution | 1.0 |
| Not Defined(ND): No influence on the score | 1.0 |
| Report Confidence(RC) - Degree of confidence on existence of vulnerability | |
| Unconfirmed(UC) | 0.90 |
| Uncorroborated(UR) | 0.95 |
| Confirmed(C) | 1.0 |
| Not Defined(ND): No influence on the score | 1.0 |

In some embodiments, the facility uses the CVSS values shown below in table 6 to quantify the security impact of an event with respect to collateral damage potential, target distribution, and security requirements.

TABLE 6

Simple Metric Values Used by the Facility in Some
Embodiments, Based on Environmental Impact on Risk

| Environmental impact on risk | CVSS Value |
|---|---|
| Collateral Damage Potential(CDP) | |
| None(N) | 0.0 |
| Low(L) | 0.1 |
| Low-Medium(LM) | 0.3 |
| Medium-High(MH) | 0.4 |
| High(H) | 0.5 |
| Not Defined(ND): No influence on the score | 0.0 |
| Target Distribution(TD) - Proportion of vulnerable systems | |
| None(N) | 0 |
| Low(L) | 0.25 |
| Medium(M) | 0.75 |
| High(H) | 1.0 |
| Not Defined(ND): No influence on the score | 1.0 |
| Security Requirement(CR, IR, AR) | |
| Low(L) | 0.5 |
| Medium(M) | 1.0 |
| High(H) | 1.51 |
| Not Defined(ND): No influence on the score | 1.0 |

Figure 5:
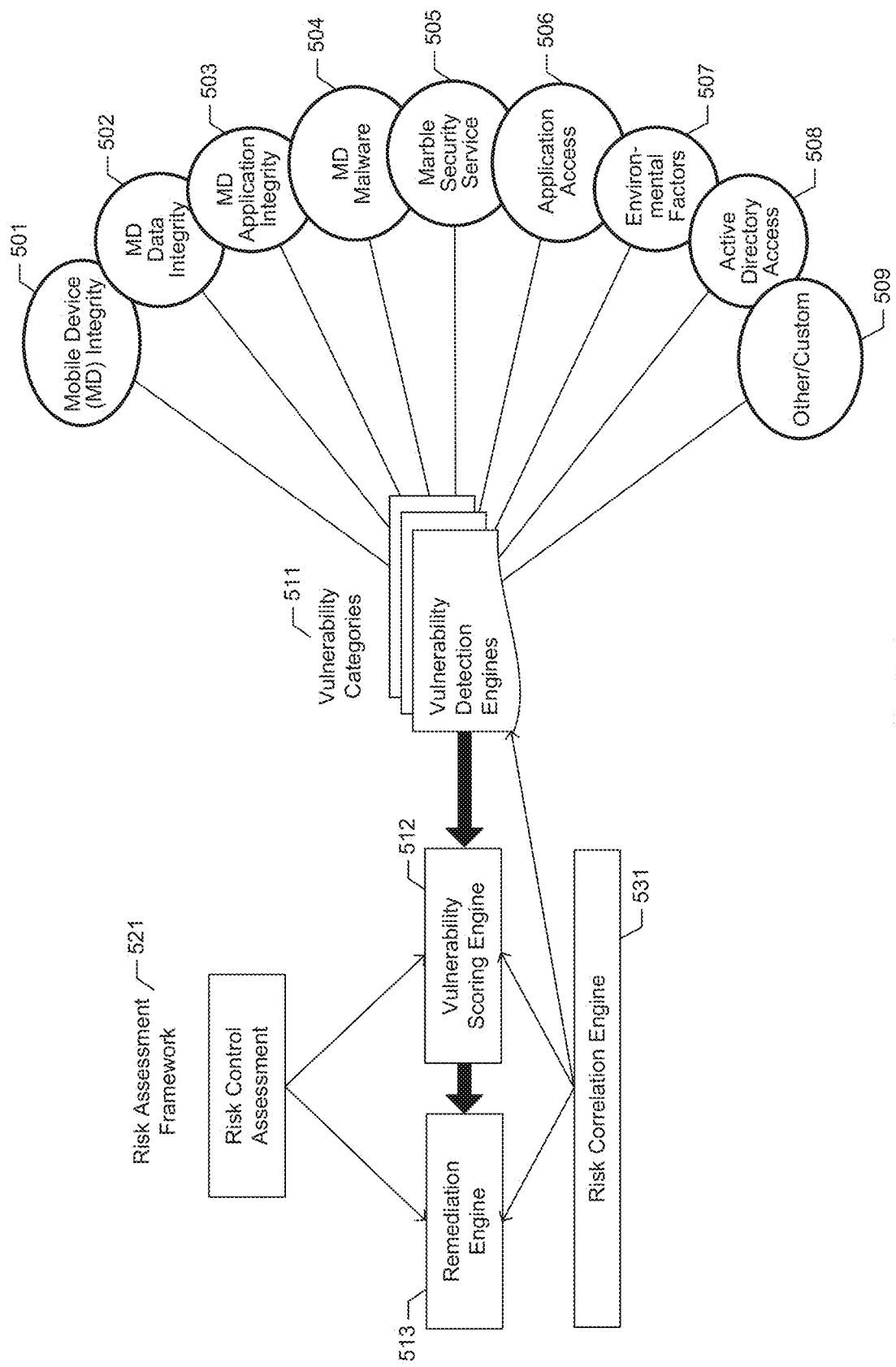
FIG. 5 is an overview diagram illustrating the process performed by the facility in some embodiments.

FIG. 5 is an overview diagram illustrating the process performed by the facility in some embodiments. A number of vulnerability detection engines 511, each in a different vulnerability category, detects vulnerabilities in one or more of a variety of categories, including mobile device integrity vulnerabilities 501, mobile device data integrity vulnerabilities 502, mobile device application integrity vulnerabilities 503, mobile device malware vulnerabilities 504, Marble Security Service vulnerabilities 505, application access vulnerabilities 506, environmental factor vulnerabilities 507, active directory access vulnerabilities 508, and vulnerabilities of a variety of other types 509. The facility subjects the vulnerabilities detected by the vulnerability detection engines to a vulnerability scoring engine 512. Subject to both risk control assessment 521 via risk assessment framework and a risk correlation engine 531, the facility subjects the scored vulnerabilities to a remediation engine 513 to select and perform remediation for the vulnerability.

Figure 6:
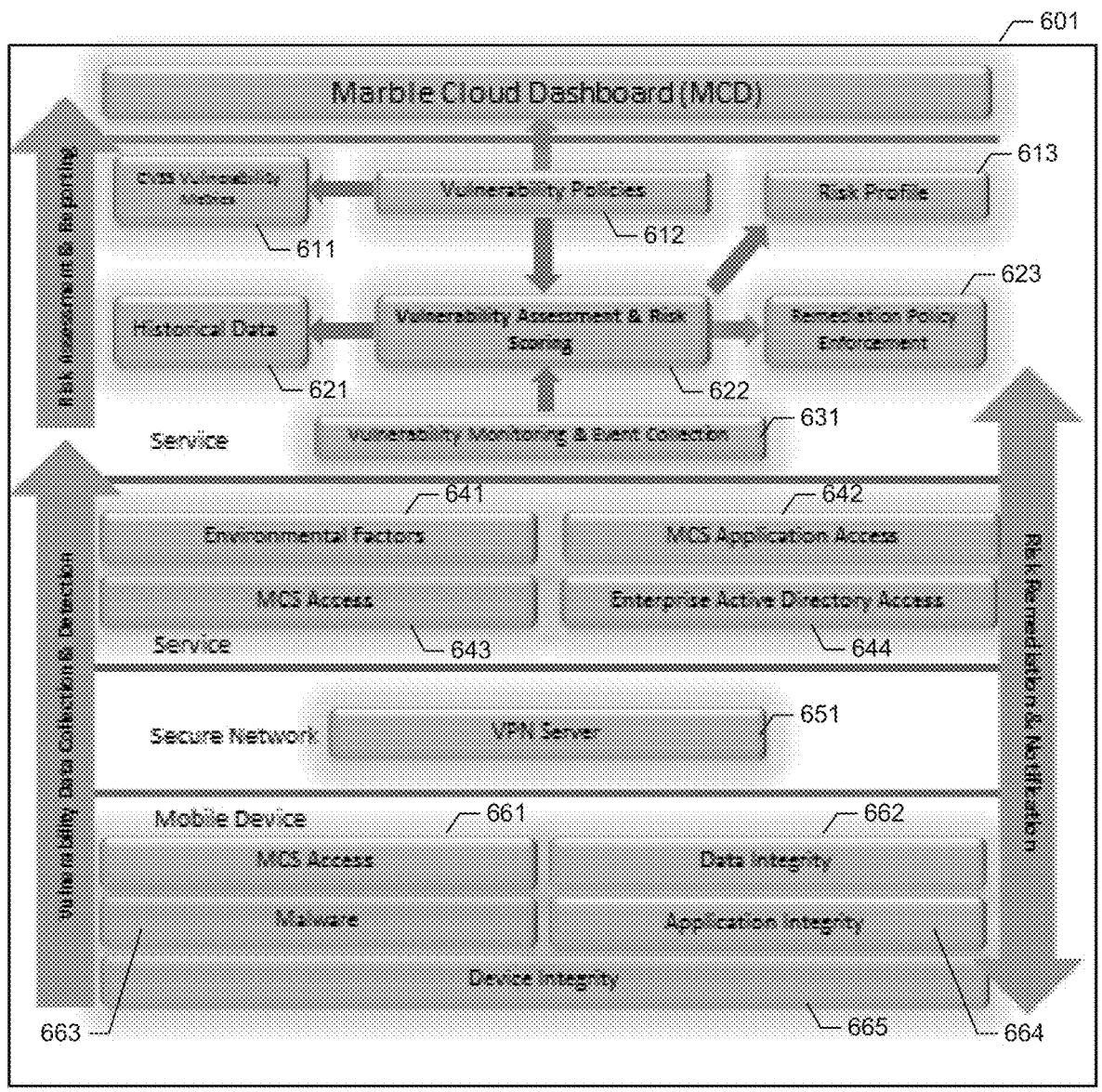
FIG. 6 is a logistical data flow diagram showing data flow within portions of the facility in some embodiments.

FIG. 6 is a logistical data flow diagram showing data flow within portions of the facility in some embodiments. As shown in FIG. 6, in some embodiments, the facility collects and detects vulnerability data relating to a number of different aspects of the mobile device and its communication with external devices: within the device, vulnerability information is detected and collected with respect to MOS access 661, data integrity 662, malware 663, application integrity 664, and device integrity 665; vulnerability data is detected and collected with respect to the VPN server 651 in the secure network; vulnerability data is detected and collected with respect to one or more remote services, including that that relates to environmental factors 641, MCS application access 642, MCS access 643, and enterprise active directory access 644. These vulnerabilities feed into a vulnerability monitoring and event collection process 631. Vulnerability events are subjected to a vulnerability assessment and risk scoring process 622. Subsequent to this assessment and scoring, vulnerability events are stored among historical data 621; added to the risk profile 613 for the device; and subjected to remediation policy enforcement 623. Vulnerability policy 612 is used in the vulnerability assessment and risk scoring, and these rely on the CVSS vulnerability metrics 611. The marble cloud dashboard 601 reports on vulnerability events, their assessment and scoring, and their remediation. In some embodiments' administrators can use the marble cloud dashboard to adjust the type and/or degree of remediation selected automatically by the facility.

Figure 7:
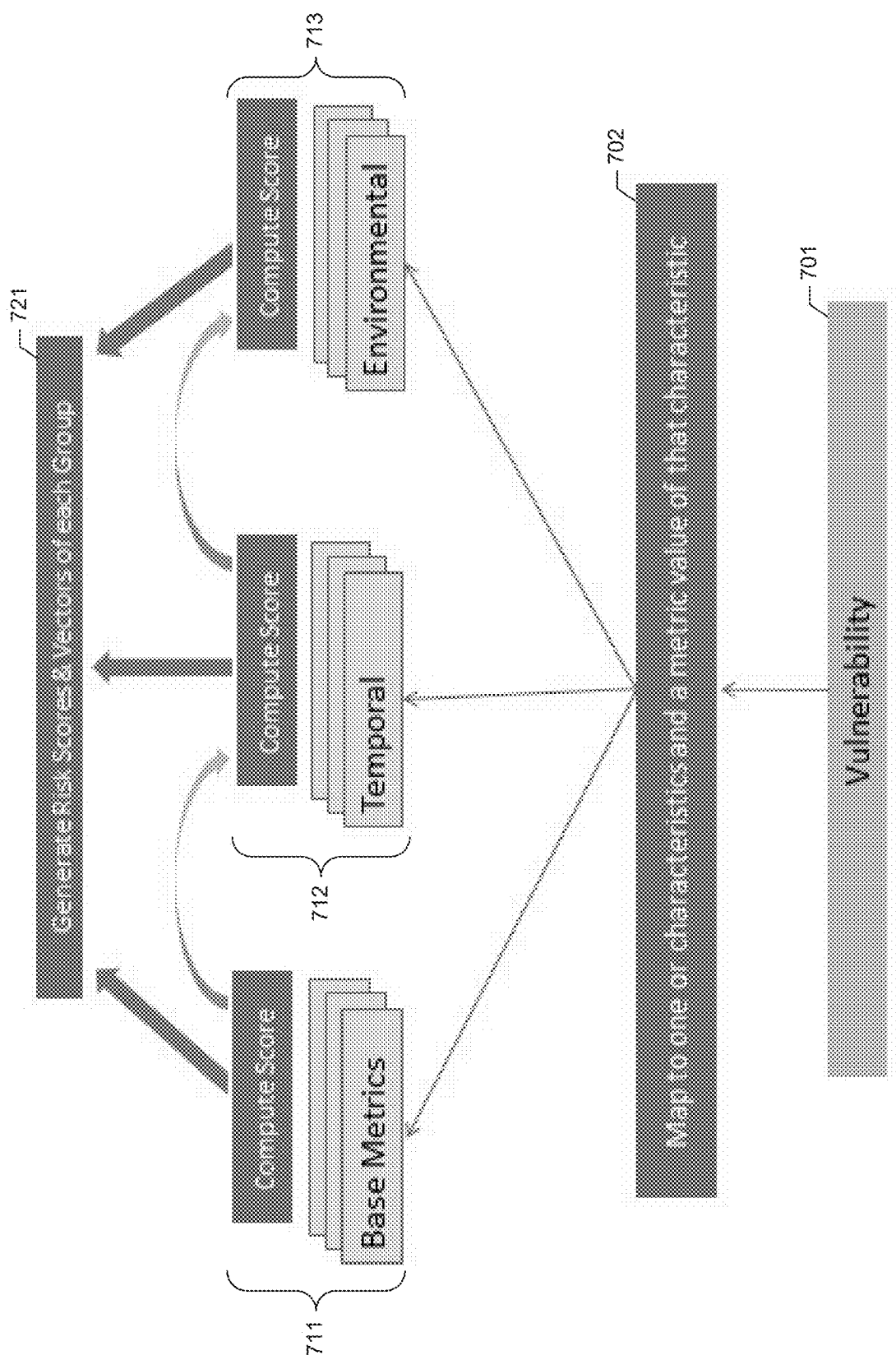
FIG. 7 is a data flow diagram that shows how the facility processes a vulnerability event in some embodiments.

FIG. 7 is a data flow diagram that shows how the facility processes a vulnerability event in some embodiments. When a vulnerability event 701 occurs, the facility maps it to one or more vulnerability characteristics, as well as a metric value for that characteristic. For example, in some embodiments, the facility maps each vulnerability event to each of base metric characteristics 711, temporal characteristics 712, and environmental characteristics 713. The facility proceeds to compute a score based on each of these characteristics, and then generate risk scores and vectors 721 across all of the groups.

Figure 8:
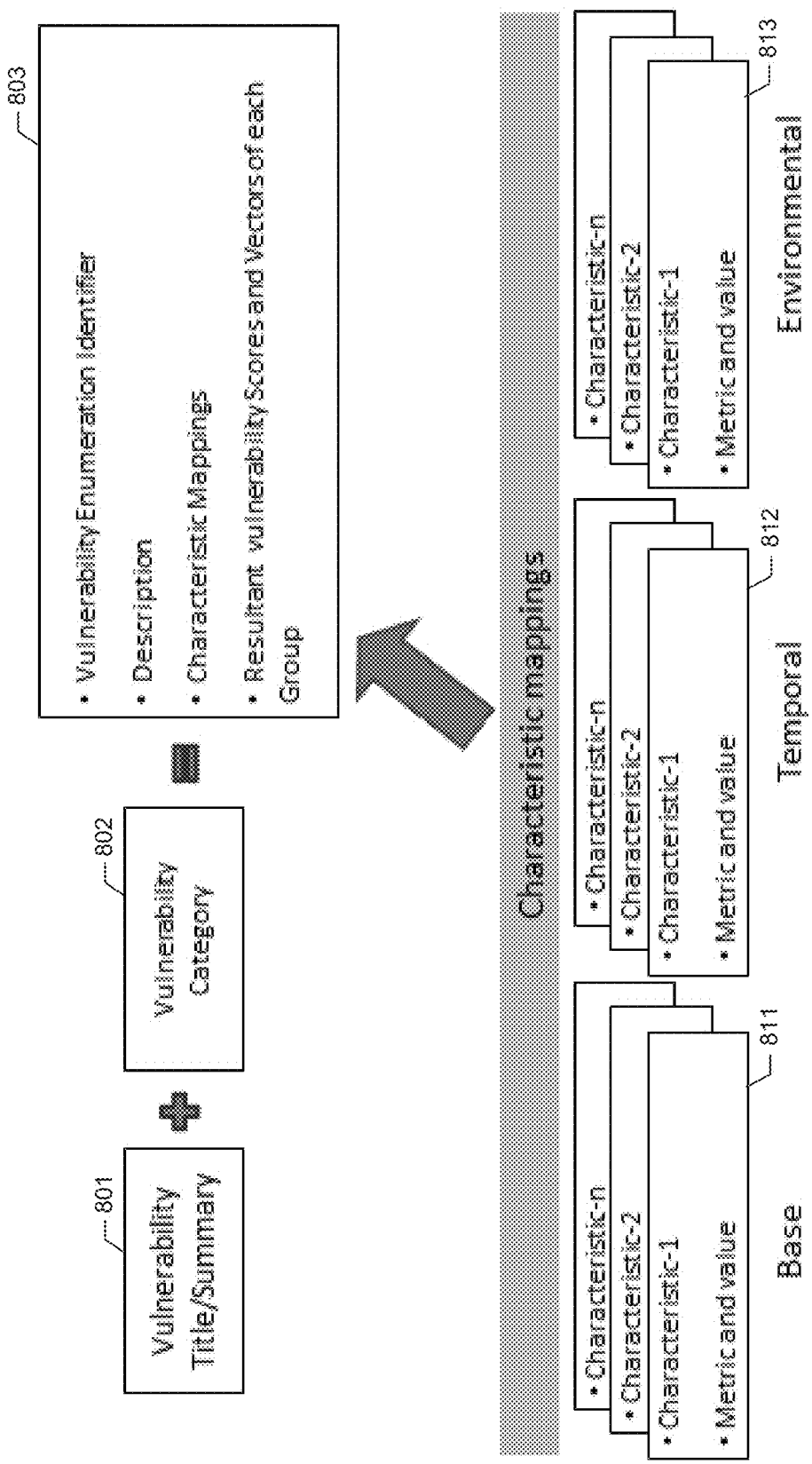
FIG. 8 is a processing diagram that depicts the mapping process for vulnerabilities.

FIG. 8 is a processing diagram that depicts the mapping process for vulnerabilities. As shown in the Figure, the facility combines vulnerability title and summary 801 with a vulnerability category 802 to obtain the following 803: vulnerability enumeration identifier, description, characteristic mappings, and resultant vulnerability scores in vectors of each group. This information is used in per-characteristic vulnerability mappings, among each of base 811, temporal 812, and environmental 813 characteristics.

Table 7 below contains information used by the facility in mapping vulnerability characteristics in some embodiments.

TABLE 7

Example, Vulnerability-metric Mapping

| Vulnerability | Base Metrics | Temporal | Environmental |
|---|---|---|---|
| Issues in OS Version, Firmware Version, Keystore, Certificate store | A: P: Availability(A), Partial(P)<br>Au: N: Authentication(Au), None(N) | Exploitability(E), High(H)<br>RemedialLevel(RL), Not Defined(ND)<br>Report Confidence(RC)-Confirmed(C) | AR: M: Availability Requirement(AR), Medium(M) |
| User and application access to hardware, such as the digital camera, GPS, Bluetooth interface, USB interface. | A: P: Availability(A), Partial(P)<br>Au: N: Authentication(Au), None(N) | Exploitability(E), High(H)<br>RemedialLevel(RL), Not Defined(ND)<br>Report Confidence(RC)-Confirmed(C) | None |
| User and application access to removable storage. | Au: N: Authentication(Au), None(N)<br>C: C Confidentiality(C), Complete(C)<br>I: C: Integrity(I), Complete(C) | Exploitability(E), High(H)<br>RemedialLevel(RL), Not Defined(ND)<br>Report Confidence(RC)-Confirmed(C) | AR: H: Availability Requirement(AR), High(H) |

Figure 9:
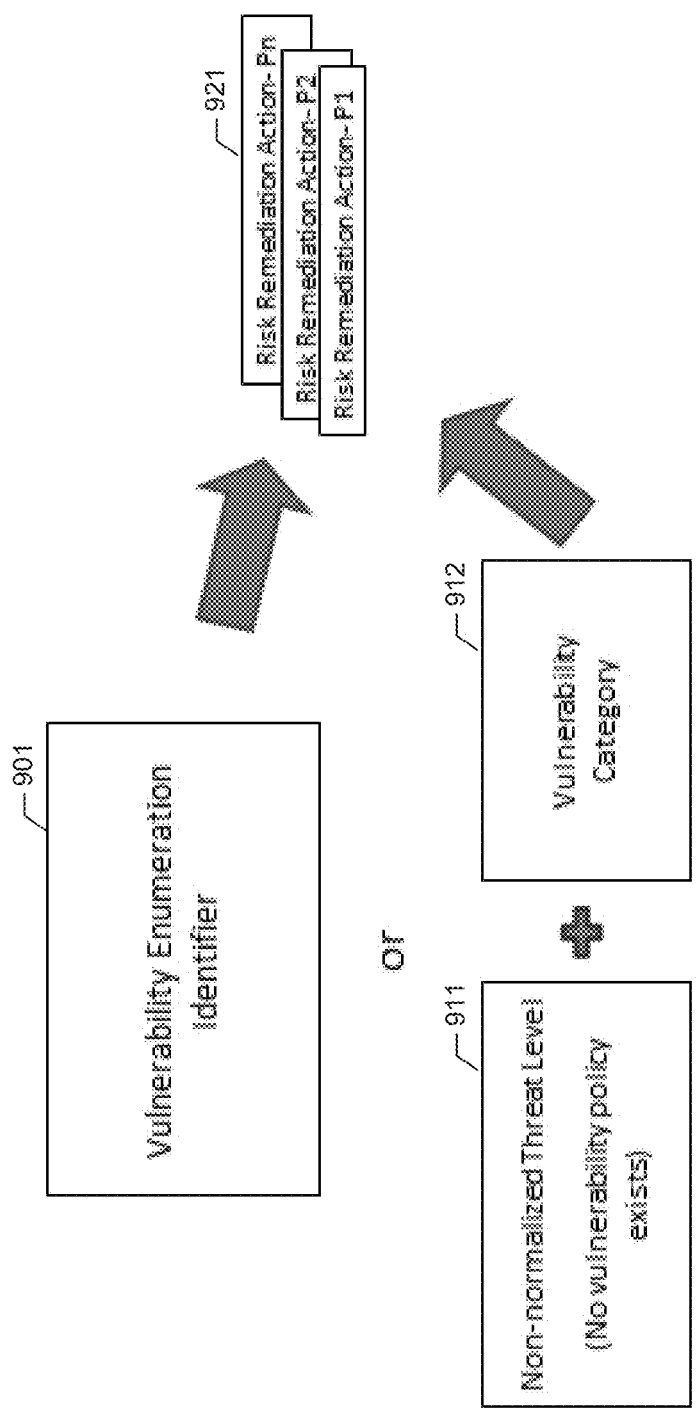
FIG. 9 is a processing diagram illustrating how the facility determines risk remediation actions in some embodiments.

FIG. 9 is a processing diagram illustrating how the facility determines risk remediation actions in some embodiments. The Figure shows that the facility may select risk remediation actions 921 either on the basis of a vulnerability enumeration identifier 901, or based upon the combination of a non-normalized threat level 911 for which no vulnerability policy exists and a vulnerability category 912.

Figure 10:
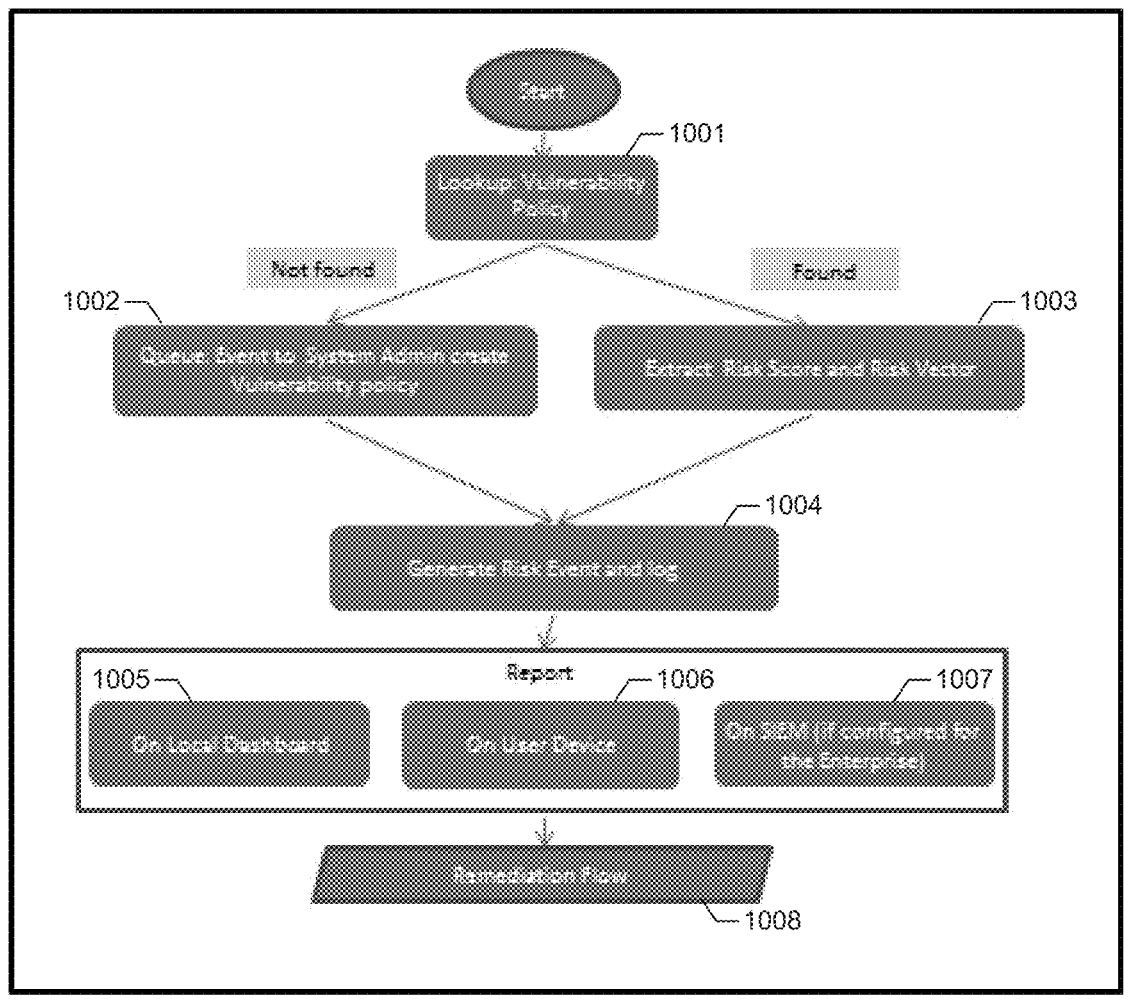
FIG. 10 is a flow diagram showing steps to be performed by the facility in order to perform vulnerability scoring.

FIG. 10 is a flow diagram showing steps to be performed by the facility in order to perform vulnerability scoring. In step 1001, the facility looks up a vulnerability policy for the vulnerability. If a policy is found, the facility continues to step 1003, else the facility continues in step 1002. In step 1002, the facility adds the vulnerability event to a system administrator queue in order to create a vulnerability policy for the event. After step 1002, the facility continues to step 1004. In step 1003, the facility extracts the risk score and risk vector specified by the vulnerability policy found in step 1001. In step 1004, the facility generates a risk event and log reflecting information about the vulnerability event and the extract risk score and risk vector. In step 1005, 1006, and/or 1007, the facility reports the risk event on a local dashboard, on the user device, and/or on the SIEM, respectively. After steps 1005-1007, the facility performs the remediation flow 1008 shown in FIG. 11 and discussed below.

Figure 11:
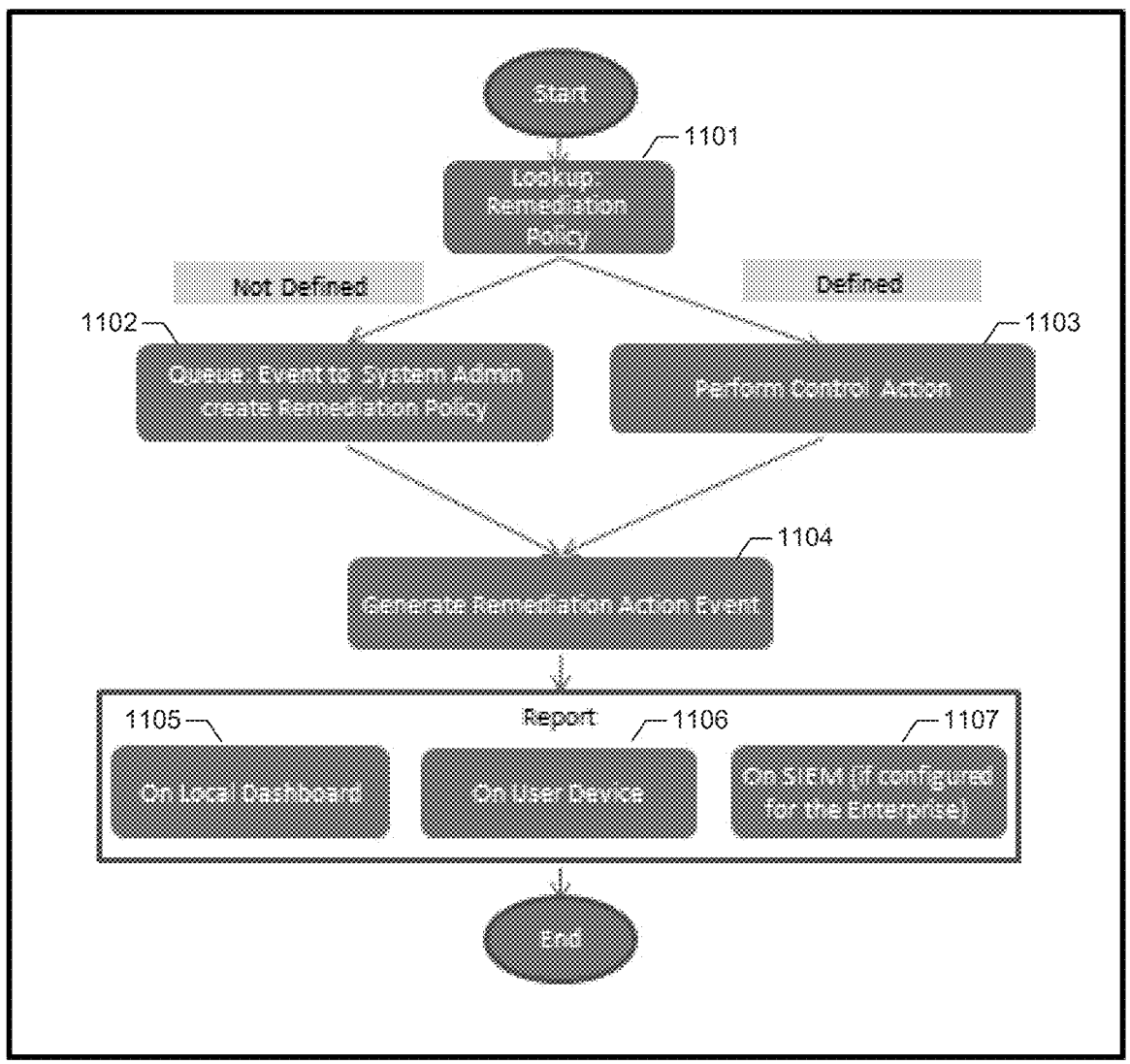
FIG. 11 is a flow diagram showing steps to be performed by the facility in order to determine and apply remediation for a vulnerability event.

FIG. 11 is a flow diagram showing steps to be performed by the facility in order to determine and apply remediation for a vulnerability event. In step 1101, the facility looks up a remediation policy corresponding to the vulnerability event. When such a remediation policy is found, then the facility continues in step 1103, else the facility continues in step 1102. In step 1102, the facility adds the event to a queue belonging to a system administrator such that the system administrator will create a remediation policy for the vulnerability event. After step 1102, the facility continues in step 1104. In step 1103, the facility performs a control action specified by the remediation policy identified in step 1101. In step 1104, a facility generates a remediation action event describing the control action taken in step 1103 in response to detecting the vulnerability. The facility then reports the remediation action event generated in step 1104 on a local dashboard 1105, on the user device 1106, and/or on the SIEM 1107. After steps 1105-1107, these steps conclude.

Figure 12:
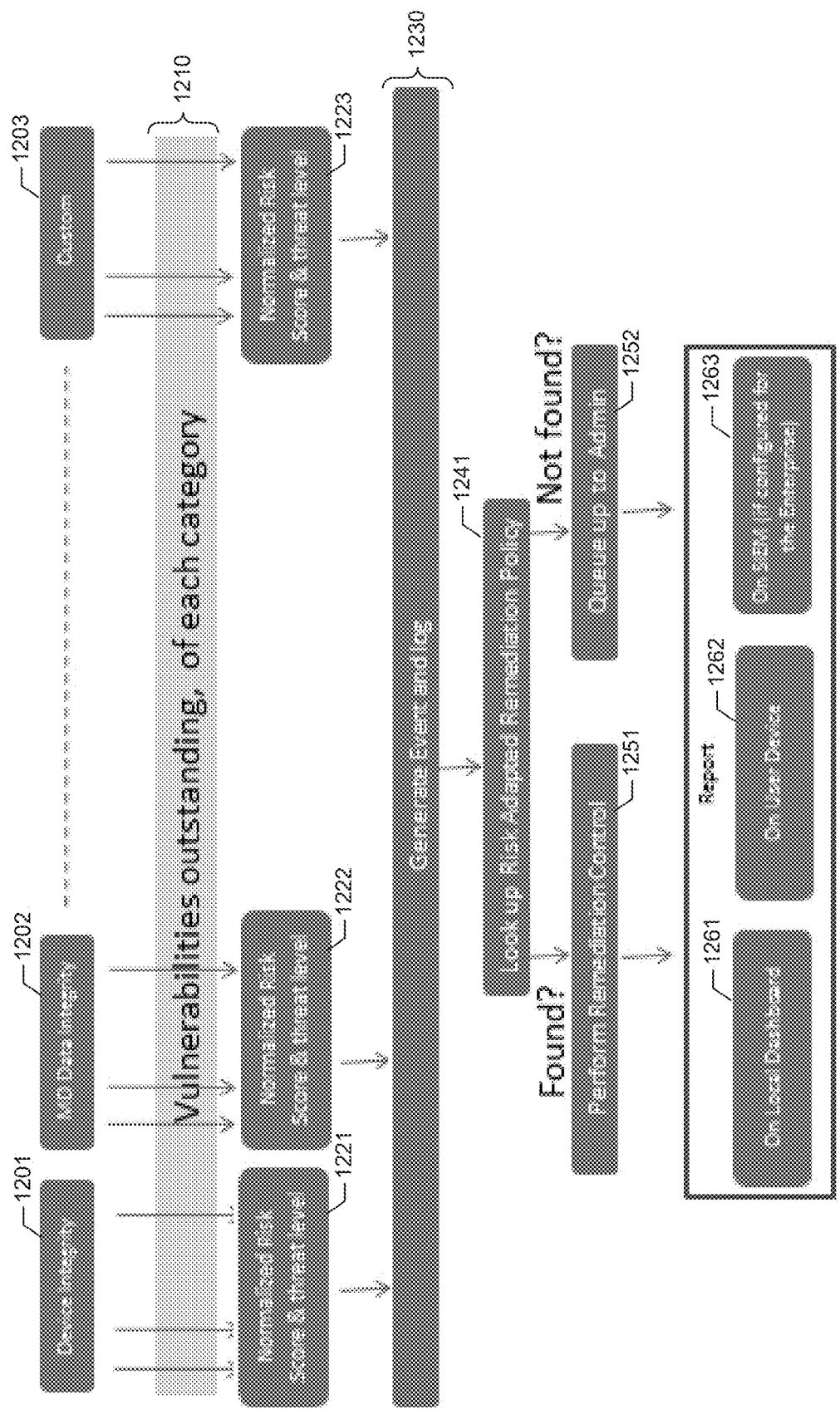
FIG. 12 is a data flow diagram showing hierarchical remediation control performed by the facility in some embodiments.

FIG. 12 is a data flow diagram showing hierarchical remediation control performed by the facility in some embodiments. Remediation control is performed across a number of vulnerability categories, including device integrity vulnerabilities 1201, MD data integrity vulnerabilities 1202, and custom vulnerabilities 1203. For each category, facility generates a normalized risk score and threat level, 1221, 1222, and 1223, respectively. In step 1230, the facility uses these normalized risk scores and threat levels across all of the categories to generate a vulnerability event, and log it. In step 1241, the facility looks up a risk-adapted remediation policy corresponding to the vulnerability event generated in step 1230. If it is found, the facility continues in step 1251, else the facility continues in step 1252. In step 1251, the facility performs remediation control as specified by the remediation policy found in step 1241. After step 1251, the facility continues in steps 1261-1263. In step 1252, the facility queues the vulnerability event so that an administrator can create an appropriate remediation policy. After step 1251 or 1252, the facility continues in steps 1261-1263 to report the vulnerability event on local dashboard 1261, on user device 1262, and/or on the SIEM 1263.

Figure 13:
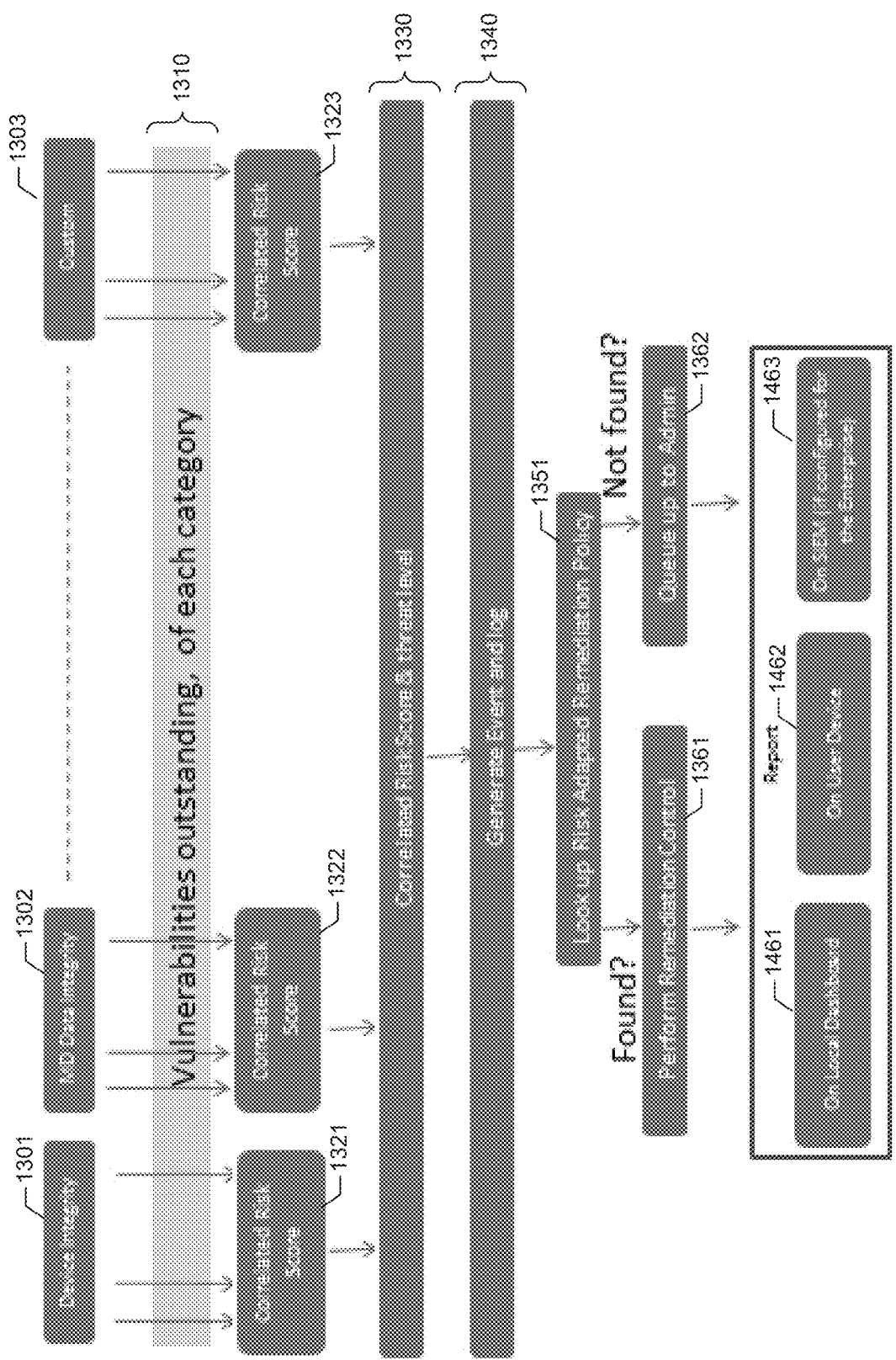
FIG. 13 is a data flow diagram showing hierarchical remediation based upon correlated risk scoring performed by the facility in some embodiments.

FIG. 13 is a data flow diagram showing hierarchical remediation based upon correlated risk scoring performed by the facility in some embodiments. FIG. 13 is similar to FIG. 12, except that the vulnerability event that is generated and logged in step 1340 is based upon a risk score and threat level that is correlated among the vulnerabilities categories 1301-1303.

Figure 14:
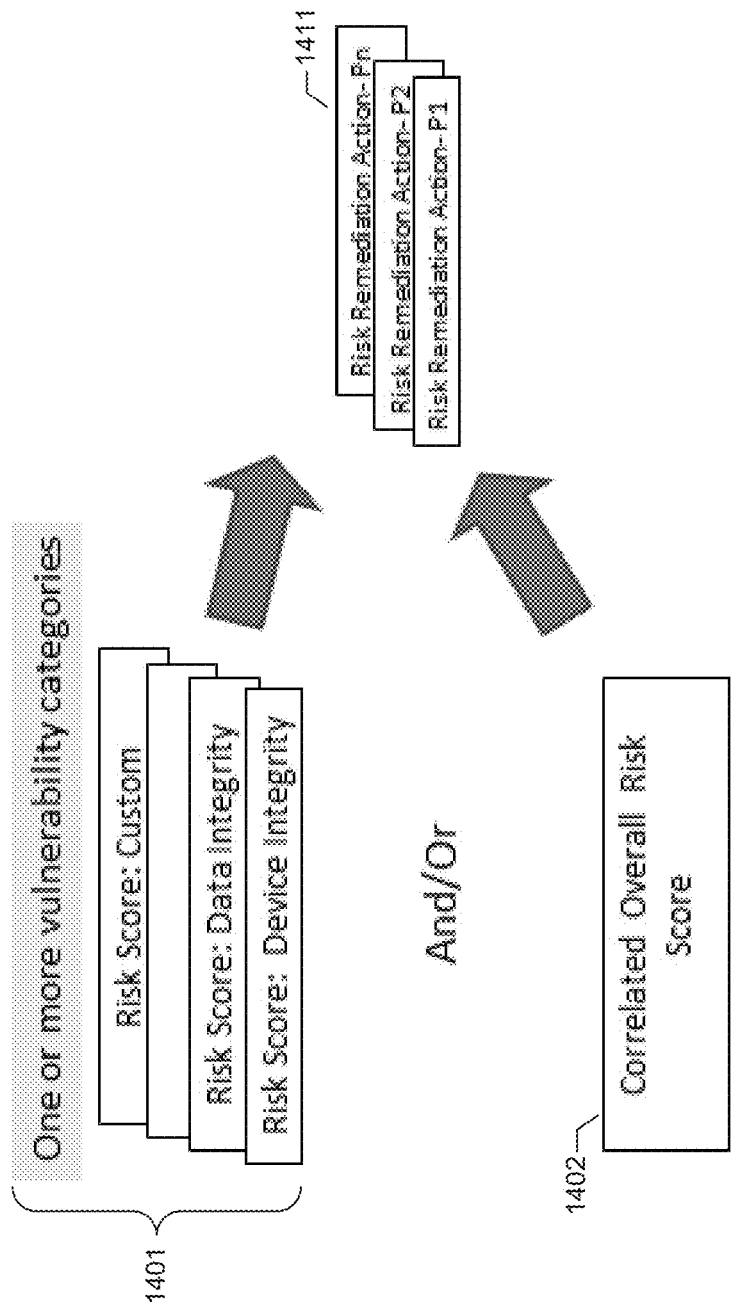
FIG. 14 is a logical diagram illustrating how the facility generates risk remediation actions using correlated risk scores.

FIG. 14 is a logical diagram illustrating how the facility generates risk remediation actions using correlated risk scores. To generate a risk remediation action 1411, the facility uses one or more of risk scores 1401 corresponding to each of one or more vulnerability categories and a correlated overall risk score 1402.

Figure 15:
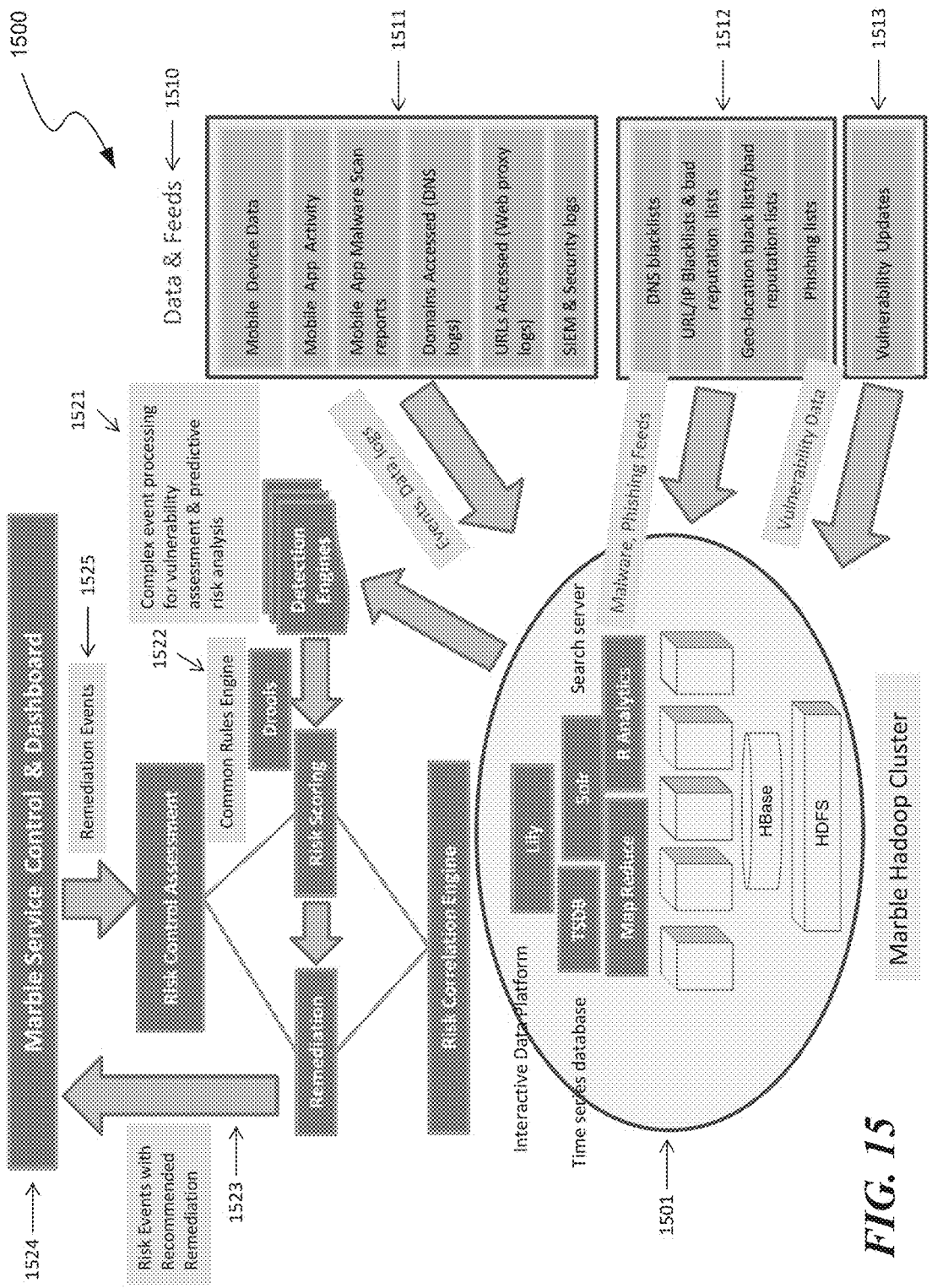
FIG. 15 is an architecture drawing that shows various subsystems used by the facility in some embodiments and how they are interconnected to perform hierarchical risk assessment and control.

FIG. 15 is an architecture drawing that shows various subsystems used by the facility in some embodiments and how they are interconnected to perform hierarchical risk assessment and control. A platform 1500 operated by the facility includes a Marble Hadoop Cluster 1501 having components Map Reduce, R Analytics, TSDB, Solr, and Lily on HBase/HDFS as shown. The Marble Hadoop Cluster is tightly interfaced through respective connectors to Data & Feeds 1510, which are comprised of: events, data, and logs 1511; Malware and Phishing feeds 1512; and Vulnerability Data 1513 as shown. Data & Feeds 1510 are collected and stored in Marble Hadoop Cluster 1501. Whenever events, data, and logs 1511 are received, the Marble Hadoop Cluster 1501 stores these, and also passes them for complex event processing for vulnerability assessment and predictive risk analysis 1521. A common rules engine 1522 provides a common rule management and evaluation framework for all processing engines including a risk scoring engine, a risk correlation engine, and a risk remediation engine. Upon processing of the event through these engines, the facility generates one or more risk events with recommended remediation 1523, and sends these to the Marble Service Control & Dashboard 1524. The facility collects remediation events 1525 from the Marble Service Control & Dashboard 1524, performs risk control assessment, and correspondingly updates the Marble Hadoop Cluster 1501.

The following shows a vulnerability scoring example that employs the vulnerability scoring formulae used by the facility in some embodiments.

Simple Vulnerability Scoring Formulae as recommended by NIST for CVSS vulnerability scoring Base Score $$\text{Base Score} = \text{round\_to\_1\_decimal}(((0.6*\text{Impact}) + (0.4*\text{Exploitability}) - 1.5)*f(\text{Impact}))$$

Where,

Impact=10.41*(1−(1−ConfImpact)*(1−IntegImpact)*(1−AvailImpact))

Exploitability=20*AccessVector*AccessComplexity*Authentication f(impact)=0 if Impact=0, 1.176 otherwise Temporal Score It is a combination of Temporal Metrics and Base Score.

$$\text{Temporal Score} = \text{round\_to\_1\_decimal}(\text{BaseScore}*\text{Exploitability}*\text{RemediationLevel}*\text{ReportConfidence})$$

Environmental Score

It is a combination of Environmental metrics and Temporal Score.

$$\text{Environmental Score} = \text{round\_to\_1\_decimal}((\text{AdjustedTemporal} + (10 - \text{AdjustedTemporal})*\text{CollateralDamagePotential})*\text{TargetDistribution})$$

Where,

AdjustedTemporal=TemporalScore recomputed with the BaseScore's Impact subequation replaced with the Adjusted Impact equation i.e Adjusted Base=AdjustedTemporal=round_to_1_decimal (((0.6*AdjustedImpact)+(0.4*AdjustedImpact)−1.5)*f(Impact)))

AdjustedImpact=min(10,10.41*(1−(1−ConfImpact*ConfReq)*(1−IntegImpact*IntegReq)*(1−AvailImpact*AvailReq)))

Example: Vulnerability Scoring

Vulnerability Enumeration: CVE-2002-0392

Statement: Apache Chunked-Encoding Memory Corruption Vulnerability.

Base Metric Evaluation Score:

Access Vector [Network] (1.00)

Access Complexity [Low] (0.71)

Authentication [None] (0.704)

Confidentiality Impact [None] (0.00)

Integrity Impact [None] (0.00)

Availability Impact [Complete] (0.66)

Base Formula Base Score

Impact=10.41*(1−(1)*(1)*(0.34))==6.9

Exploitability=20*0.71*0.704*1==10.0 f(Impact)=1.176

BaseScore=(0.6*6.9+0.4*10.0−1.5)*1.176==(7.8)

BaseVector=AV:N/AC:L/Au:N/C:N/I:N/A:C

Temporal Metric Evaluation Score:

Exploitability [Functional] (0.95)

Remediation Level [Official-Fix] (0.87)

Report Confidence [Confirmed] (1.00)

Temporal Formula Temporal Score

TemporalScore=round(7.8*0.95*0.87*1.00)==(6.4)

TemporalVector=E:F/RL:OF/RC:C

Environmental Formula Environmental Score

AdjustedImpact=min(10,10.41*(1−(1−0*1)*(1−01)*
(1−0.66*1.51))==(10.0)

AdjustedBase=((0.6*10)+(0.4*10.0)−1.5)*1.176==
(10.0)

AdjustedTemporal==(10*0.95*0.87*1.0)==(8.3)

EnvironmentalScore=round((8.3+(10−8.3)*
{0−0.5})*{0−1})==(0.00−9.2)

EnvironmentalVector=CDP:N/TD:N/CR:M/IR:M/
AR:H

It will be appreciated by those skilled in the art that the above-described facility may be straightforwardly adapted or extended in various ways.

We claim:

1. A method, comprising:
   collecting or detecting vulnerability data from distributed sources, the vulnerability data including:
   a first vulnerability data set from aspects of a mobile device, the mobile device being a first source of the distributed sources,
   a second vulnerability data set from communication between the mobile device and a server in a secure network, the server being a second source of the distributed sources, and
   a third set vulnerability data set from communication between the mobile device and a network service, the network service being a third source of the distributed sources, the collecting or detecting performed by a facility having a processor, a non-transitory computer-readable medium, and stored instructions translatable by the processor, the facility configured for enhancing security of mobile devices in a mobile networking environment;
   centrally processing the vulnerability data in order of threat priority associated therewith, the processing performed by the facility, the processing comprising:
   for each vulnerability event in the vulnerability data:
      determining, from a plurality of vulnerability policies, a matching vulnerability policy that matches a respective vulnerability event in the vulnerability data and that contains a risk score;
      extracting the risk score from the matching vulnerability policy;
      based at least on the risk score extracted from the matching vulnerability policy, determining a best matching risk remediation policy for the respective vulnerability event in the vulnerability data; and
      performing a remediation for the mobile device per the best matching risk remediation policy to remediate the respective vulnerability event in the vulnerability data; and
      reporting, through a user interface of the facility, vulnerability events in the vulnerability data and associated remediations for the mobile device in the order of the threat priority.

2. The method according to claim 1, wherein the aspects of the mobile device comprise at least one of mobile cloud service (MCS) access, data integrity, malware, application integrity, or device integrity, wherein the server in the secure network comprises a virtual private network (VPN) server in a VPN, and wherein the network service relates to an environmental factor, MCS application access, security monitoring, application access, or active directory access.

3. The method according to claim 1, wherein the processing further comprises:
   responsive to a vulnerability event in the vulnerability data having no matching vulnerability policy or matching risk remediation policy, placing the vulnerability event in a review queue.

4. The method according to claim 1, further comprising:
   storing the vulnerability events in a historical data store.

5. The method according to claim 1, further comprising:
   adding the vulnerability events to a risk profile for the mobile device.

6. The method according to claim 1, further comprising:
   generating a remediation action event describing the remediation taken; and
   communicating the remediation action event to the user interface.

7. The method according to claim 1, wherein the user interface is configured for allowing a user to adjust a type, degree, or level of the remediation selected automatically by the facility and wherein the user interface comprises a dashboard, a mobile device user interface, or a security information and event management (SIEM) user interface.

8. The method according to claim 1, wherein the threat priority comprises none, low, medium, or high.

9. The method according to claim 1, wherein the remediation comprises a solution, a fix, a patch, a temporary fix, or a work around.

10. A system, comprising:
   a processor;
   a non-transitory computer-readable medium; and
   stored instructions translatable by the processor for:
      collecting or detecting vulnerability data from distributed sources, the vulnerability data including:
      a first vulnerability data set from aspects of a mobile device, the mobile device being a first source of the distributed sources,
      a second vulnerability data set from communication between the mobile device and a server in a secure network, the server being a second source of the distributed sources, and
      a third set vulnerability data set from communication between the mobile device and a network service, the network service being a third source of the distributed sources;
      centrally processing the vulnerability data in order of threat priority associated therewith, the processing comprising:
      for each vulnerability event in the vulnerability data:
         determining, from a plurality of vulnerability policies, a matching vulnerability policy that matches a respective vulnerability event in the vulnerability data and that contains a risk score;
         extracting the risk score from the matching vulnerability policy;
         based at least on the risk score extracted from the matching vulnerability policy, determining a best matching risk remediation policy for the respective vulnerability event in the vulnerability data; and
         performing a remediation for the mobile device per the best matching risk remediation policy to remediate the respective vulnerability event in the vulnerability data; and reporting, through a user interface, vulnerability events in the vulnerability data and associated remediations for the mobile device in the order of the threat priority.

11. The system of claim 10, wherein the aspects of the mobile device comprise at least one of mobile cloud service (MCS) access, data integrity, malware, application integrity, or device integrity, wherein the server in the secure network comprises a virtual private network (VPN) server in a VPN, and wherein the network service relates to an environmental factor, MCS application access, security monitoring, application access, or active directory access.

12. The system of claim 10, wherein the processing further comprises:
responsive to a vulnerability event in the vulnerability data having no matching vulnerability policy or matching risk remediation policy, placing the vulnerability event in a review queue.

13. The system of claim 10, wherein the stored instructions are further translatable by the processor for:
storing the vulnerability events in a historical data store.

14. The system of claim 10, wherein the stored instructions are further translatable by the processor for:
adding the vulnerability events to a risk profile for the mobile device.

15. The system of claim 10, wherein the stored instructions are further translatable by the processor for:
generating a remediation action event describing the remediation taken; and
communicating the remediation action event to the user interface.

16. The system of claim 10, wherein the user interface is configured for allowing a user to adjust a type or degree of the remediation selected automatically by the facility and wherein the user interface comprises a dashboard, a mobile device user interface, or a security information and event management (SIEM) user interface.

17. The system of claim 10, wherein the threat priority comprises none, low, medium, or high.

18. The system of claim 10, wherein the remediation comprises a solution, a fix, a patch, a temporary fix, or a work around.

19. A computer program product comprising a non-transitory computer-readable medium storing instructions translatable by a processor to perform:
collecting or detecting vulnerability data from distributed sources, the vulnerability data including:
a first vulnerability data set from aspects of a mobile device, the mobile device being a first source of the distributed sources,
a second vulnerability data set from communication between the mobile device and a server in a secure network, the server being a second source of the distributed sources, and
a third set vulnerability data set from communication between the mobile device and a network service, the network service being a third source of the distributed sources;
centrally processing the vulnerability data in order of threat priority associated therewith, the processing comprising:
for each vulnerability event in the vulnerability data:
determining, from a plurality of vulnerability policies, a matching vulnerability policy that matches a respective vulnerability event in the vulnerability data and that contains a risk score;
extracting the risk score from the matching vulnerability policy;
based at least on the risk score extracted from the matching vulnerability policy, determining a best matching risk remediation policy for the respective vulnerability event in the vulnerability data; and
performing a remediation for the mobile device per the best matching risk remediation policy to remediate the respective vulnerability event in the vulnerability data; and
reporting, through a user interface, vulnerability events in the vulnerability data and associated remediations for the mobile device in the order of the threat priority.

20. The computer program product of claim 19, wherein the aspects of the mobile device comprise at least one of mobile cloud service (MCS) access, data integrity, malware, application integrity, or device integrity, wherein the server in the secure network comprises a virtual private network (VPN) server in a VPN, and wherein the network service relates to an environmental factor, MCS application access, security monitoring, application access, or active directory access.

21. The computer program product of claim 19, wherein the processing further comprises:
responsive to a vulnerability event in the vulnerability data having no matching vulnerability policy or matching risk remediation policy, placing the vulnerability event in a review queue.

22. The computer program product of claim 19, wherein the instructions are further translatable by the processor for:
storing the vulnerability events in a historical data store.

23. The computer program product of claim 19, wherein the instructions are further translatable by the processor for:
adding the vulnerability events to a risk profile for the mobile device.

24. The computer program product of claim 19, wherein the instructions are further translatable by the processor for:
generating a remediation action event describing the remediation taken; and
communicating the remediation action event to the user interface.

25. The computer program product of claim 19, wherein the user interface is configured for allowing a user to adjust a type or degree of the remediation selected automatically by the facility and wherein the user interface comprises a dashboard, a mobile device user interface, or a security information and event management (SIEM) user interface.

26. The computer program product of claim 19, wherein the threat priority comprises none, low, medium, or high.

27. The computer program product of claim 19, wherein the remediation comprises a solution, a fix, a patch, a temporary fix, or a work around.

* * * * *